United States Patent
Banzashi et al.

(10) Patent No.: US 10,899,899 B2
(45) Date of Patent: Jan. 26, 2021

(54) SHEET, METHOD FOR PRODUCING SHEET, AND LAMINATE

(71) Applicant: Oji Holdings Corporation, Tokyo (JP)

(72) Inventors: Go Banzashi, Tokyo (JP); Koh Sakai, Tokyo (JP); Yuichi Noguchi, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 15/750,031

(22) PCT Filed: Aug. 5, 2016

(86) PCT No.: PCT/JP2016/073069
§ 371 (c)(1),
(2) Date: Feb. 2, 2018

(87) PCT Pub. No.: WO2017/022848
PCT Pub. Date: Feb. 9, 2017

(65) Prior Publication Data
US 2018/0230279 A1   Aug. 16, 2018

(30) Foreign Application Priority Data

Aug. 5, 2015   (JP) ................... 2015-155002
Aug. 5, 2015   (JP) ................... 2015-155003

(51) Int. Cl.
*C08J 5/18*   (2006.01)
*D21H 11/18*   (2006.01)
(Continued)

(52) U.S. Cl.
CPC .............. *C08J 5/18* (2013.01); *B32B 5/02* (2013.01); *B32B 5/26* (2013.01); *B32B 7/02* (2013.01);
(Continued)

(58) Field of Classification Search
CPC . C08J 5/18; C08J 5/2212; C08J 5/2287; C08J 7/12; C08J 7/14
(Continued)

(56) References Cited

U.S. PATENT DOCUMENTS 4,882,220 A * 11/1989 Ono .................... D06M 13/005
442/96
7,910,654 B2 * 3/2011 Takeda .................... C08L 1/14
525/54.23
(Continued)

FOREIGN PATENT DOCUMENTS

CN   102264766 A   11/2011
CN   102264822 A   11/2011
(Continued)

OTHER PUBLICATIONS

Japanese Office Action dated Nov. 20, 2018 for corresponding Application No. 2015-155002, along with an English translation.
(Continued)

*Primary Examiner* — Jane L Stanley
(74) *Attorney, Agent, or Firm* — Birch, Stewart, Kolasch & Birch, LLP

(57) ABSTRACT

An object of the present invention is to improve the strength of a sheet containing substituent-introduced ultrafine fiber under high-humidity conditions while maintaining its high transparency. The sheet of the present invention comprises ultrafine fiber having an ionic substituent, and a divalent or higher metal, and has a haze of 10.0% or less.

14 Claims, 3 Drawing Sheets

(51) Int. Cl.

| | | |
|---|---|---|
| *D01F 1/10* | (2006.01) | |
| *D01F 2/00* | (2006.01) | |
| *B32B 7/02* | (2019.01) | |
| *B32B 5/02* | (2006.01) | |
| *D21H 25/02* | (2006.01) | |
| *D21H 11/20* | (2006.01) | |
| *D21H 17/64* | (2006.01) | |
| *C08B 15/02* | (2006.01) | |
| *C08L 1/04* | (2006.01) | |
| *D21H 21/20* | (2006.01) | |
| *C08L 1/02* | (2006.01) | |
| *D21H 17/66* | (2006.01) | |
| *C08B 5/00* | (2006.01) | |
| *C08L 1/16* | (2006.01) | |
| *B32B 5/26* | (2006.01) | |
| *D01F 2/24* | (2006.01) | |

(52) U.S. Cl.
CPC .......... *C08B 5/00* (2013.01); *C08B 15/02* (2013.01); *C08L 1/02* (2013.01); *C08L 1/04* (2013.01); *C08L 1/16* (2013.01); *D01F 1/10* (2013.01); *D01F 2/00* (2013.01); *D01F 2/24* (2013.01); *D21H 11/18* (2013.01); *D21H 11/20* (2013.01); *D21H 17/64* (2013.01); *D21H 17/66* (2013.01); *D21H 21/20* (2013.01); *D21H 25/02* (2013.01); *C08J 2301/10* (2013.01); *C08J 2301/16* (2013.01); *D10B 2201/20* (2013.01)

(58) Field of Classification Search
USPC ............................................... 428/323
See application file for complete search history.

(56) References Cited

U.S. PATENT DOCUMENTS

| | | | | |
|---|---|---|---|---|
| 8,354,162 | B2* | 1/2013 | Yoshihara | G02B 1/10 428/172 |
| 10,273,633 | B2* | 4/2019 | Banzashi | B32B 5/28 |
| 2008/0138606 | A1* | 6/2008 | Yoshihara | B32B 7/02 428/327 |
| 2008/0177056 | A1* | 7/2008 | Hashimoto | B29C 48/08 536/56 |
| 2011/0262731 | A1 | 10/2011 | Mukai et al. | |
| 2012/0000392 | A1* | 1/2012 | Mukai | C08B 15/02 106/163.01 |
| 2012/0237761 | A1 | 9/2012 | Mukai et al. | |
| 2015/0027648 | A1 | 1/2015 | Tsuji et al. | |
| 2017/0226407 | A1* | 8/2017 | Homma | C09K 8/10 |
| 2018/0282946 | A1* | 10/2018 | Fushimi | B32B 5/02 |
| 2019/0055697 | A1* | 2/2019 | Sakai | C08J 5/18 |
| 2019/0127915 | A1* | 5/2019 | Noguchi | D21H 15/02 |
| 2019/0359795 | A1* | 11/2019 | Sakai | C08L 29/04 |
| 2020/0131279 | A1* | 4/2020 | Fushimi | D21H 11/18 |

FOREIGN PATENT DOCUMENTS

| | | |
|---|---|---|
| CN | 102597076 A | 7/2012 |
| EP | 2 371 893 A1 | 10/2011 |
| EP | 2884000 A1 | 6/2015 |
| JP | 9-105099 A | 4/1997 |
| JP | 2008-308802 A | 12/2008 |
| JP | 2010-202855 A | 9/2010 |
| JP | 2010-202856 A | 9/2010 |
| JP | 2010-254726 A | 11/2010 |
| JP | 2011-132501 A | 7/2011 |
| JP | 2011-148914 A | 8/2011 |
| JP | 2011-224545 A | 11/2011 |
| JP | 2012-511596 A | 5/2012 |
| JP | 2013-127141 A | 6/2013 |
| JP | 2013-245259 A | 12/2013 |
| JP | 2014-55323 A | 3/2014 |
| JP | 2014-193580 A | 10/2014 |
| JP | 2014-223737 A | 12/2014 |
| JP | 2016-87877 A | 5/2016 |
| TW | 201226452 A | 7/2012 |
| WO | WO 2010/066036 A1 | 6/2010 |
| WO | WO 2013/073652 A1 | 5/2013 |
| WO | WO 2013/137140 A1 | 9/2013 |
| WO | WO 2016/07231 A1 | 5/2016 |

OTHER PUBLICATIONS

Extended European Search Report dated Jan. 8, 2019, issued in corresponding European patent application No. 16833127.0.
Japanese Office Action, dated Apr. 23, 2019, for corresponding Japanese Application No. 2015-155002, with an English translation.
International Preliminary Report on Patentability and Written Opinion of the International Searching Authority (Forms PCT/IB/338, PCT/IB/373 and PCT/ISA/237) for International Application No. PCT/JP2016/073069, dated Feb. 15, 2018, with English translation.
International Search Report (Forms PCT/ISA/220 and PCT/ISA/210) for International Application No. PCT/JP2016/073069, dated Oct. 18, 2016.
Akira Isogai, Composite Materials of TEMPO-Oxidized Cellulose Single Nanofiber, Nihongomukyoukaishi, vol. 85, No. 12 (2012), pp. 388-393, with partial English translation.
Third Party Observation dated Jul. 30, 2019 submitted in corresponding Japanese Patent Application No. 2015-155002.
Chinese Office Acton and Search Report, dated Nov. 27, 2019, for corresponding Chinese Application No. 201680045603.0, with an English translation.
Taiwanese Office Action and Search Report, dated Dec. 12, 2019, for corresponding Taiwanese Application No. 105124939, with an English translation.
Japanese Office Action for corresponding Japanese Application No. 2016-154274, dated Jun. 23, 2020, with English translation.
Chinese Office Action, dated Jul. 22, 2020, for corresponding Chinese Application No. 201680045603.0, with an English translation.
Japanese Office Action, dated Aug. 11, 2020, for corresponding Japanese Application No. 2019-145419, with machine English translation.
Taiwanese Office Action, dated Jun. 29, 2020, for corresponding Taiwanese Application No. 105124939, with an English translation.

* cited by examiner

[Figure 1]
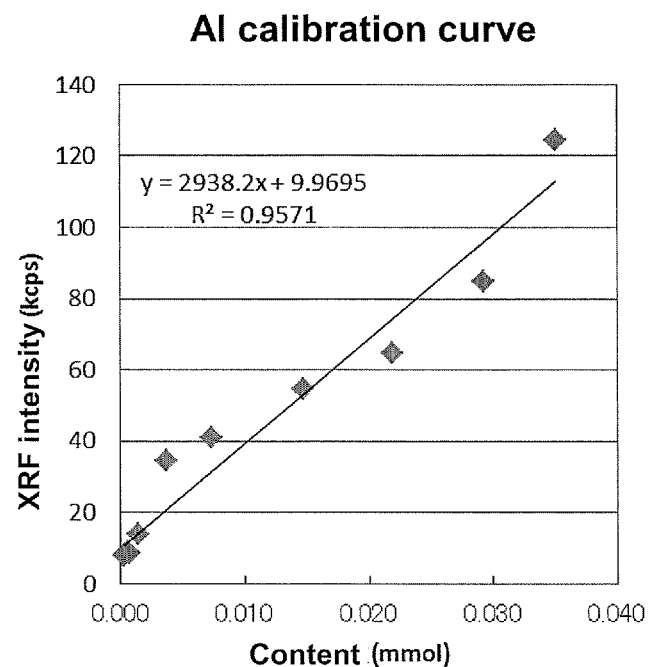
[Figure 2]
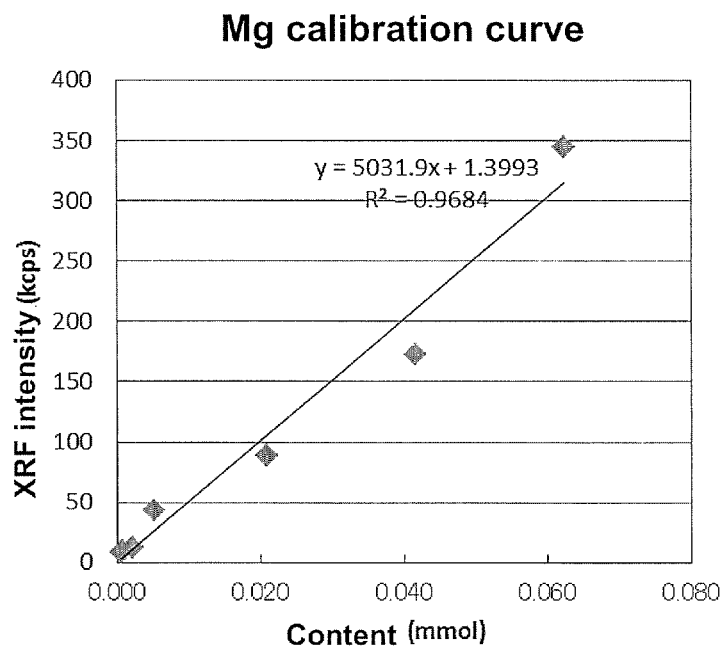

[Figure 3]
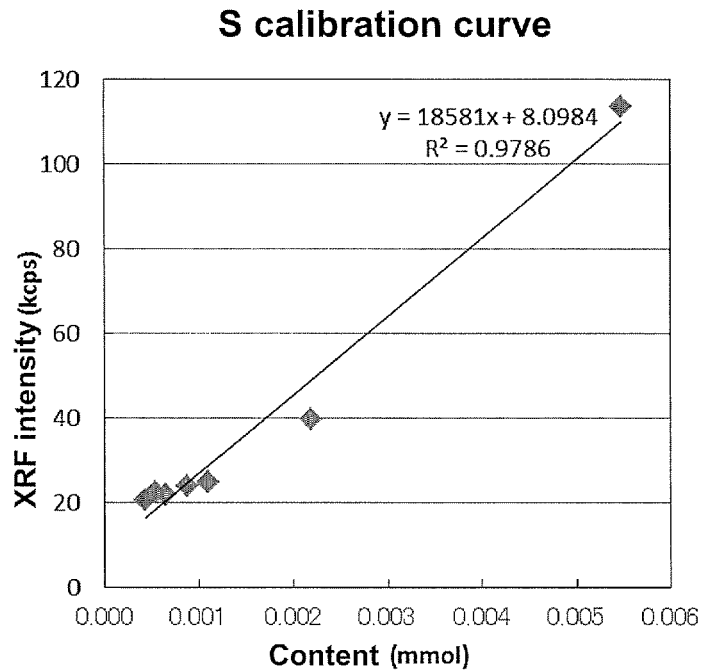
[Figure 4]
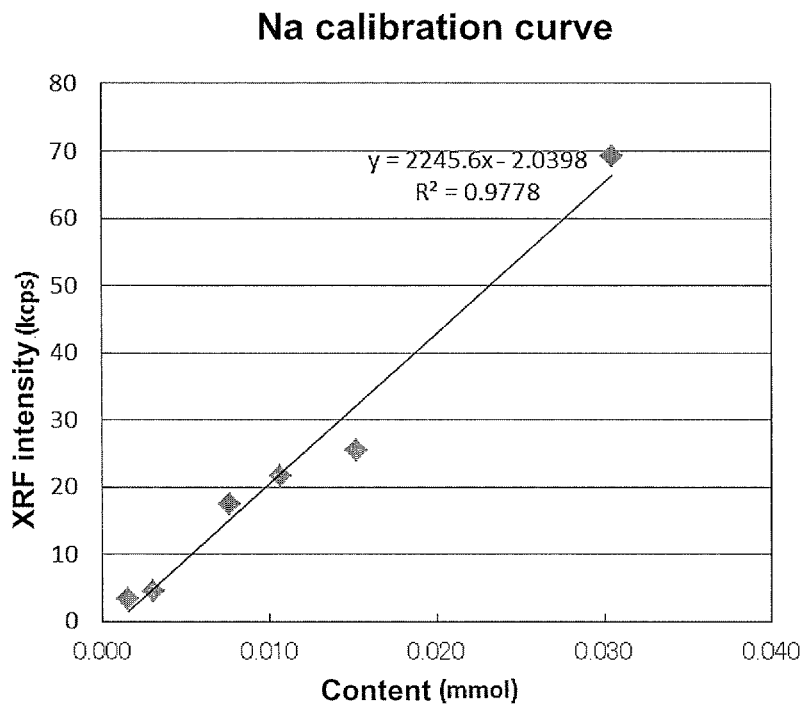

[Figure 5]
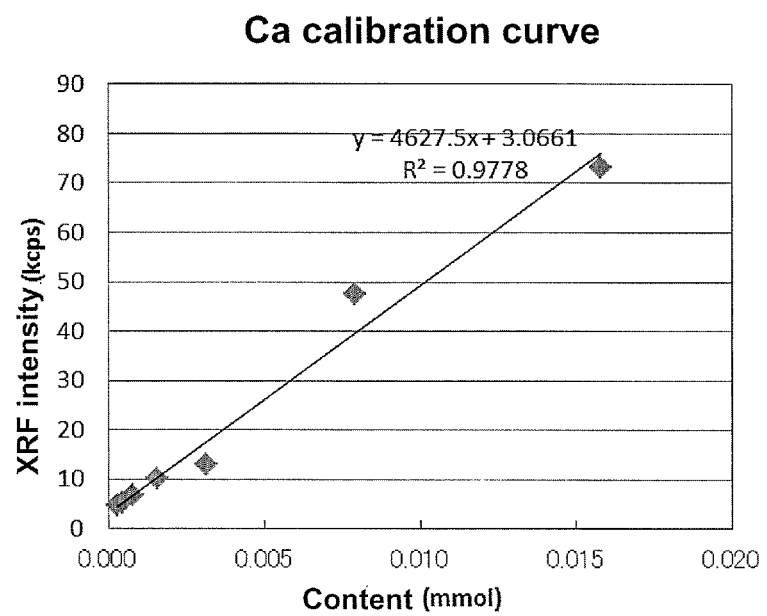

SHEET, METHOD FOR PRODUCING SHEET, AND LAMINATE

TECHNICAL FIELD

The present invention relates to a sheet, a method for producing a sheet, and a laminate. The sheet of the present invention has high transparency, furthermore is excellent in mechanical properties in a wet state, and is suitable for various purposes, such as packaging materials, which require transparency. Moreover, the sheet in a predetermined aspect of the present invention has high transparency, furthermore is excellent in mechanical properties in a wet state, has suppressed yellowing under high-temperature conditions, and is suitable for various purposes such as optical materials.

BACKGROUND ART

With increase in the awareness of alternatives to petroleum resources and environments, materials utilizing reproducible natural fibers have received attention in recent years. Among the natural fibers, cellulose fiber having a fiber diameter of 10 to 50 µm, particularly, wood-derived cellulose fiber (pulp), has been widely used so far, mainly as paper products.

Ultrafine cellulose fiber having a fiber diameter of 1 µm or smaller is also known as the cellulose fiber. A sheet containing the ultrafine cellulose fiber exhibits largely improved tensile strength because the point of contact between fiber filaments is drastically increased. Also, its transparency is largely improved because the fiber width is shorter than the wavelength of visible light. A method which involves introducing a substituent having electrostatic and/or steric functionality to a fiber raw material in order to facilitate the nanofibrillation (defibration) of the fiber raw material is known as a method for producing ultrafine fiber (e.g., Patent Documents 1 to 4).

Meanwhile, improvement in the sheet containing the ultrafine cellulose fiber has been studied in terms of improvement in gas barrier properties, etc. For example, Patent Document 5 proposes, as a method for producing a laminate having high barrier properties against water vapor or oxygen, a method for producing a gas-barrier laminate, comprising: a first application step of applying a first liquid to a base material, the first liquid containing cellulose ultrafine fiber, wherein the carboxy group content of the cellulose is 0.1 to 3 mmol/g; and a second application step of applying a second liquid to the first liquid-applied portion of the base material, the second liquid containing one or more members selected from the group consisting of a layered inorganic compound, a cross-linking agent, an inorganic metal salt, and an organic metal salt. Also, Patent Document 6 proposes, as a laminate having excellent water proofness, a laminate comprising a coating layer containing cellulose nanofiber and a metal salt on a base material, wherein the cellulose nanofiber is anion-modified (carboxymethylated or carboxylated) cellulose nanofiber, and the metal salt is a trivalent metal salt. Further, Patent Document 7 proposes, as a gas-barrier laminate containing cellulose and having favorable gas barrier properties even under highly humid conditions, a gas-barrier laminate comprising a layer (A) containing cellulose nanofiber having a carboxy group and a layer (B) containing a polyvalent metal compound, on a base material, wherein the layer (A) and the layer (B) are in contact with each other, and the cellulose nanofiber in the layer (A) is ionically cross-linked by a polyvalent metal ion derived from the polyvalent metal compound.

PRIOR ART DOCUMENTS

Patent Documents

Patent Document 1: JP 2008-308802 A
Patent Document 2: JP 2010-254726 A
Patent Document 3: JP 2012-511596 A
Patent Document 4: International Publication No. WO 2013/073652
Patent Document 5: JP 2011-224545 A
Patent Document 6: JP 2014-193580 A
Patent Document 7: JP 2014-223737 A

SUMMARY OF INVENTION

Object to be Solved by the Invention

A sheet containing substituent-introduced ultrafine fiber has high transparency, but has high hygroscopic properties due to the presence of the hydrophilic substituent and might thus be swollen and broken under high-humidity conditions, resulting in poor strength. However, all of Patent Documents 5 to 7 are aimed at improving sheet performance in terms of water vapor barrier properties or water-absorbing properties, and do not even focus on improving strength under high-humidity conditions while maintaining transparency. The sheet containing substituent-introduced ultrafine fiber which has both high transparency and strength at a given level or higher under high-humidity conditions, is desired.

Means for Solving the Object

Meanwhile, in order to solve the problems described above, the present inventors have conducted diligent studies on means such as the elimination of the substituent from slurry before sheet formation, the changing of the degree of neutralization of the substituent, and the elimination of the substituent from a formed sheet. The present inventors have recently attempted to use a divalent or higher metal ion as a substituent-blocking agent as a method having a lighter load on the process. As a result, the present inventors have completed the present invention by finding that a sheet having strength at a given level or higher without being swollen and broken under wet conditions, while maintaining its high transparency is obtained by treating a sheet containing ultrafine fiber having a substituent with a divalent or higher metal ion under appropriately controlled conditions. The present inventors have completed the present invention by also finding that the yellowing of the sheet treated with the divalent or higher metal ion as mentioned above is suppressed by further treating the sheet with a salt of a weak acid.

The present invention provides the following invention.
[1] A sheet comprising ultrafine fiber having an ionic substituent, and a divalent or higher metal, and having a haze of 10.0% or less (hereinafter referred to as a sheet of first aspect).
[2] The sheet according to [1], wherein a content of the divalent or higher metal is 0.10 mmol/g or larger.
[3] The sheet according to [1] or [2], wherein the ultrafine fiber is ultrafine cellulose fiber having one or two or more ionic substituents selected from the group consisting of a phosphoric acid-derived group, a carboxylic acid-derived group, and a sulfuric acid-derived group.

[4] The sheet according to any one of [1] to [3], wherein a tensile strength under wet conditions is 10.0 MPa or higher.

[5] The sheet according to any one of [1] to [4], wherein a tensile modulus of elasticity under wet conditions is 0.7 GPa or higher.

[6] A sheet comprising ultrafine fiber having an ionic substituent, and a divalent or higher metal, wherein change in the degree of yellowing ($\Delta YI$) satisfies the following expression (1) (hereinafter referred to as a sheet of second aspect):

$$\Delta YI = YI_2 - YI_1 \leq 20 \quad (1)$$

wherein $YI_1$ represents yellowness before vacuum drying at 200° C. for 4 hours, and $YI_2$ represents yellowness after the vacuum drying at 200° C. for 4 hours.

[7] The sheet according to [6], wherein a content of the divalent or higher metal is 0.10 mmol/g or larger.

[8] The sheet according to [6] or [7], wherein the ultrafine fiber is ultrafine cellulose fiber having one or two or more ionic substituents selected from the group consisting of a phosphoric acid-derived group, a carboxylic acid-derived group, and a sulfuric acid-derived group.

[9] The sheet according to any one of [6] to [8], wherein the sheet comprises at least one member selected from the group consisting of an alkali metal and an alkaline earth metal.

[10] The sheet according to any one of [6] to [9], wherein the ultrafine fiber is ultrafine cellulose fiber having one or two ionic substituents selected from the group consisting of a phosphoric acid-derived group and a carboxylic acid-derived group, wherein a content of sulfur is 0.05 mmol/g or smaller.

[11] The sheet according to any one of [6] to [10], wherein a tensile strength under wet conditions is 20.0 MPa or higher.

[12] The sheet according to any one of [6] to [11], wherein a tensile modulus of elasticity under wet conditions is 0.7 GPa or higher.

[13] A laminate comprising an inorganic layer and/or an organic layer formed on at least one side of a sheet according to any one of [1] to [12].

[14] A method for producing a sheet, comprising preparing a sheet from ultrafine fiber having an ionic substituent; and treating the prepared sheet with a strong acid-derived salt of a divalent or higher metal.

[15] The method for producing a sheet according to [14], further comprising treating the treated sheet with a salt of a weak acid and a strong base.

Advantageous Effects of Invention

The sheet of the first aspect obtained by the present invention has high transparency and is excellent in mechanical properties under wet conditions. The sheet of the second aspect obtained by the present invention has high transparency and is excellent in mechanical properties under wet conditions. The sheet of the second aspect further has suppressed yellowing.

BRIEF DESCRIPTION OF DRAWINGS

FIG. 1 shows a calibration curve of the amount of aluminum introduced prepared in Examples.

FIG. 2 shows a calibration curve of the amount of magnesium introduced prepared in Examples.

FIG. 3 shows a calibration curve of sulfur prepared in Examples.

FIG. 4 shows a calibration curve of the amount of sodium introduced prepared in Examples.

FIG. 5 shows a calibration curve of the amount of calcium introduced prepared in Examples.

EMBODIMENT OF CARRYING OUT THE INVENTION

The terms "part" and "%" mean ratios based on mass (part by mass and % by mass, respectively) unless otherwise specified. A value regarding the mass of fiber of cellulose or the like is based on absolute dry mass (solid content) unless otherwise specified. The numerical range "X to Y" includes both of the values X and Y unless otherwise specified. The term "A and/or B" refers to at least one of A and B and may mean only A, may mean only B, or may mean both A and B, unless otherwise specified.

The present invention provides a sheet comprising ultrafine fiber having an ionic substituent, and a divalent or higher metal. Such a sheet can be produced by a production method comprising the following steps:
(1) preparing a sheet from ultrafine fiber having an ionic substituent; and
(2) treating the prepared sheet with a solution of a strong acid-derived salt of a divalent or higher metal.

The present invention further provides a sheet comprising ultrafine fiber having an ionic substituent, and a divalent or higher metal, and having small change in the degree of yellowing. Such a sheet can be produced by a production method comprising the following steps:
(1) preparing a sheet from ultrafine fiber having an ionic substituent;
(2) treating the prepared sheet with a strong acid-derived salt of a divalent or higher metal; and
(3) further treating the treated sheet with a salt of a weak acid and a strong base.

Hereinafter, the method for producing a sheet will first be described, and subsequently, a structure and properties as a sheet itself (object) will be described about a sheet obtained by the production method.

[Method for Producing Sheet]

The ultrafine fiber having an ionic substituent in the step (1) is obtained by introducing the ionic substituent to a fiber raw material, and subjecting the obtained fiber raw material having the substituent to nanofibrillation (defibration) treatment.

<Fiber Raw Material>

Examples of the fiber raw material include, but are not particularly limited to, organic fiber, inorganic fiber, synthetic fiber, semisynthetic fiber, and regenerated fiber. Examples of the organic fiber include, but are not limited to, natural product-derived fiber such as cellulose, carbon fiber, pulp, chitin, and chitosan. Examples of the inorganic fiber include, but are not limited to, glass fiber, rock fiber, and metal fiber. Examples of the synthetic fiber include, but are not limited to, nylon, vinylon, vinylidene, polyester, polyolefin (e.g., polyethylene and polypropylene), polyurethane, acryl, polyvinyl chloride, and aramid. Examples of the semisynthetic fiber include, but are not limited to, acetate, triacetate, and promix. Examples of the regenerated fiber include, but are not limited to, rayon, cupra, polynosic rayon, lyocell, and Tencel.

The fiber raw material used in the present invention desirably contains a hydroxyl group or an amino group without particular limitations because of facilitating substituent introduction mentioned later.

For the fiber raw material, pulp is preferably used from the viewpoint of easy availability and inexpensiveness. The pulp is selected from wood pulp, non-wood pulp, and deinking pulp. Examples of the wood pulp include chemical pulp such as leaf bleached kraft pulp (LBKP), needle bleached kraft pulp (NBKP), sulfite pulp (SP), alkaline pulp (AP), unbleached kraft pulp (UKP), and oxygen-delignified kraft pulp (OKP). Also, Examples of the wood pulp include, but are not particularly limited to: semichemical pulp such as semichemical pulp (SCP) and chemiground wood pulp (CGP); and mechanical pulp such as ground pulp (GP) and thermomechanical pulp (TMP and BCTMP). Examples of the non-wood pulp include, but are not particularly limited to: cotton-based pulp such as cotton linter and cotton lint; non-wood-based pulp such as linen, straw, and bagasse; and cellulose, chitin, and chitosan which are isolated from sea squirt, seaweed, or the like. Examples of the deinking pulp include, but are not particularly limited to, deinking pulp prepared using used paper as a raw material. As the pulp of this embodiment, one of these pulps may be used alone, or two or more thereof may be used as a mixture. Among these pulps, cellulose-containing wood pulp or deinking pulp is preferred from the viewpoint of easy availability. Among the wood pulps, chemical pulp has a large proportion of cellulose and is therefore particularly preferred from the viewpoint of achieving a high yield of cellulose ultrafine fiber at the time of fiber nanofibrillation (defibration) and the small decomposition of cellulose in the pulp, and obtaining long-fibered cellulose ultrafine fiber having a large axial ratio, though the pulp is not particularly limited thereto. Among them, kraft pulp or sulfite pulp is most preferably selected, though the pulp is not particularly limited thereto. Hereinafter, the case of using a cellulose fiber raw material or ultrafine cellulose fiber may be described as an example as to the present invention and embodiments or Examples thereof. Those skilled in the art can understand the present invention by appropriately applying the description to the case of using other fiber raw materials.

<Introduction of Ionic Substituent>

The ionic substituent is introduced to the fiber raw material. Examples of the method for introducing the substituent to the fiber include, but are not particularly limited to, oxidation treatment and treatment with a compound capable of forming a covalent bond with a functional group in cellulose. The oxidation treatment is treatment of converting a hydroxy group in cellulose to an aldehyde group or a carboxy group. Examples thereof include TEMPO oxidation treatment and treatment using various oxidizing agents (sodium chlorite, ozone, etc.).

One example of the oxidation treatment can include, but is not particularly limited to, a method described in Biomacromolecules 8, 2485-2491, 2007 (Saito et al.).

The treatment with a compound capable of forming a covalent bond with a functional group in cellulose can be carried out by mixing the fiber raw material in a dry state or in a wet state with a compound that is reactive with the fiber raw material, and thereby introducing the substituent to the fiber raw material. For the introduction, a heating method is particularly effective for accelerating the reaction. The heat treatment temperature for the introduction of the substituent is not particularly limited and is preferably a temperature zone in which the thermal decomposition, hydrolysis, or the like of the fiber raw material is less likely to occur. For example, 250° C. or lower is preferred from the viewpoint of the thermal decomposition temperature of cellulose, and heat treatment at 100 to 170° C. is preferred from the viewpoint of suppressing cellulose hydrolysis.

The compound reactive with the fiber raw material is not particularly limited as long as ultrafine fiber can be obtained and the ionic substituent is introduced.

In the case of introducing an anionic substituent, examples of the compound reactive with the fiber raw material include a compound having a phosphoric acid-derived group, a compound having a carboxylic acid-derived group, a compound having a sulfuric acid-derived group, and a compound having a sulfonic acid-derived group. A compound having at least one group selected from the group consisting of a phosphoric acid-derived group, a carboxylic acid-derived group, and a sulfuric acid-derived group is preferred because of its easy handling and reactivity with fiber. More preferably, any of these compounds forms ester or/and ether with fiber without particular limitations.

The compound having a phosphoric acid-derived group, used as the compound reactive with the fiber raw material is not particularly limited and is at least one member selected from the group consisting of phosphoric acid, polyphosphoric acid, phosphorous acid, phosphonic acid, polyphosphonic acid, and their salts and esters. Among them, a compound having phosphoric acid group is preferred because the compound has low cost, is easily handled, and can further improve nanofibrillation (defibration) efficiency by introducing the phosphoric acid group to the fiber raw material, though the compound is not particularly limited thereto.

Examples of the compound having a phosphoric acid group include, but are not particularly limited to: phosphoric acid; lithium dihydrogen phosphate, dilithium hydrogen phosphate, trilithium phosphate, lithium pyrophosphate, and lithium polyphosphate, which are lithium salts of phosphoric acid; sodium dihydrogen phosphate, disodium hydrogen phosphate, trisodium phosphate, sodium pyrophosphate, and sodium polyphosphate, which are sodium salts of phosphoric acid; potassium dihydrogen phosphate, dipotassium hydrogen phosphate, tripotassium phosphate, potassium pyrophosphate, and potassium polyphosphate, which are potassium salts of phosphoric acid; and ammonium dihydrogen phosphate, diammonium hydrogen phosphate, triammonium phosphate, ammonium pyrophosphate, and ammonium polyphosphate, which are ammonium salts of phosphoric acid.

Among them, phosphoric acid, a sodium salt of phosphoric acid, a potassium salt of phosphoric acid, or an ammonium salt of phosphoric acid is preferred, and sodium dihydrogen phosphate or disodium hydrogen phosphate is more preferred, from the viewpoint of high phosphoric acid group introduction efficiency and easy industrial applicability, though the compound is not particularly limited thereto.

The compound is preferably used as an aqueous solution without particular limitations because of its reaction homogeneity and high phosphoric acid-derived group introduction efficiency. The pH of the aqueous solution of the compound is not particularly limited and is preferably 7 or lower because of producing high phosphoric acid group introduction efficiency. The pH is particularly preferably 3 to 7 from the viewpoint of suppressing fiber hydrolysis, though the pH is not particularly limited thereto.

The compound having a carboxylic acid-derived group, used as the compound reactive with the fiber raw material is not particularly limited and is at least one member selected from the group consisting of a compound having a carboxy group, an acid anhydride of the compound having a carboxy group, and their derivatives.

Examples of the compound having a carboxy group include, but are not particularly limited to: dicarboxylic acid compounds such as maleic acid, succinic acid, phthalic acid, fumaric acid, glutaric acid, adipic acid, and itaconic acid; and tricarboxylic acid compounds such as citric acid and aconitic acid.

Examples of the acid anhydride of the compound having a carboxy group include, but are not particularly limited to, acid anhydrides of dicarboxylic acid compounds, such as maleic anhydride, succinic anhydride, phthalic anhydride, glutaric anhydride, adipic anhydride, and itaconic anhydride.

Examples of the derivative of the compound having a carboxy group include, but are not particularly limited to, an imidized form of the acid anhydride of the compound having a carboxy group, and a derivative of the acid anhydride of the compound having a carboxy group. Examples of the imidized form of the acid anhydride of the compound having a carboxy group include, but are not particularly limited to, imidized forms of dicarboxylic acid compounds, such as maleimide, succinimide, and phthalimide.

Examples of the derivative of the acid anhydride of the compound having a carboxy group include, but are not particularly limited to, compounds derived from the acid anhydride of the compound having a carboxy group by the replacement of at least a portion of hydrogen atoms with a substituent (e.g., an alkyl group or a phenyl group), such as dimethylmaleic anhydride, diethylmaleic anhydride, and diphenylmaleic anhydride.

Among these compounds having a carboxylic acid-derived group, maleic anhydride, succinic anhydride, or phthalic anhydride is preferred because of its easy industrial applicability and easy gasification, though the compound is not particularly limited thereto.

The compound having a sulfuric acid-derived group, used as the compound reactive with the fiber raw material is not particularly limited and is at least one member selected from the group consisting of sulfuric anhydride, sulfuric acid, and their salts and esters. Among them, sulfuric acid is preferred because the compound has low cost and can further improve nanofibrillation (defibration) efficiency by introducing the sulfuric acid group to the fiber raw material, though the compound is not particularly limited thereto.

The substituent can be introduced to the fiber raw material, thereby improving the dispersibility of the fiber in a solution and enhancing nanofibrillation (defibration) efficiency.

The amount of the ionic substituent introduced is not particularly limited as long as sufficient nanofibrillation is carried out. The amount of the ionic substituent introduced can be determined in consideration of the content of the divalent or higher metal or the amount of the substituent introduced as a sheet. When the sheet of the present invention contains ultrafine fiber having an anionic substituent, the amount of the substituent introduced (based on a titration method) is preferably $0.005\alpha$ to $0.11\alpha$, more preferably $0.01\alpha$ to $0.08\alpha$, per g (mass) of the fiber. When the amount of the substituent introduced is $0.005\alpha$ or more, the nanofibrillation (defibration) of the fiber raw material is easy. When the amount of the substituent introduced is $0.11\alpha$ or less, fiber lysis can be suppressed. In this context, $\alpha$ represents the amount (unit: mmol/g) of a functional group that can be reacted with the compound reactive with the fiber material, for example, a hydroxyl group or an amino group, contained per g of the fiber material.

The amount of the substituent introduced on the fiber surface can be measured (titration method) by the following method, unless otherwise specified:

Ultrafine fiber-containing slurry having a solid content of approximately 0.04 g in terms of absolute dry mass is separated and diluted to approximately 50 g using ion-exchange water. When a 0.01 N aqueous sodium hydroxide solution is added dropwise to this solution with stirring, change in the value of electric conductivity is measured. The amount of the 0.01 N aqueous sodium hydroxide solution added dropwise that offers the smallest value of electric conductivity is defined as the amount of the solution added dropwise at the titration end-point. An amount X of the substituent on the cellulose surface is represented by X (mmol/g)=0.01 (mol/l)×V (ml)/W (g). In this context, V: the amount of the 0.01 N aqueous sodium hydroxide solution added dropwise (ml), and W: the solid content (g) in the cellulose ultrafine fiber-containing slurry.

When the introduced substituent is at least one group selected from the group consisting of a phosphoric acid-derived group, a carboxylic acid-derived group, and a sulfuric acid-derived group, the amount of the substituent introduced is not particularly limited and can be 0.001 to 5.0 mmol/g. The amount of the substituent introduced may be 0.05 to 4.0 mmol/g or may be 0.1 to 2.0 mmol/g.

<Alkali Treatment>

If necessary, alkali treatment may be carried out after the introduction of the ionic substituent and before nanofibrillation treatment described later. The alkali treatment can supply a cation to the anionic substituent introduced in the fiber to easily form a salt. The alkali treatment is also preferred from the viewpoint of improving a fiber yield.

The method for the alkali treatment is not particularly limited. The alkali treatment can be carried out, for example, by dipping the ionic substituent-introduced cellulose fiber in an alkali solution.

The alkali compound contained in the alkali solution may be an inorganic alkali compound or may be an organic alkali compound. Examples of the inorganic alkali compound are hydroxides, carbonates, and phosphates of alkali metals or alkaline earth metals. More specific examples thereof are lithium hydroxide, sodium hydroxide, potassium hydroxide, calcium hydroxide, lithium carbonate, lithium bicarbonate, potassium carbonate, potassium bicarbonate, sodium carbonate, sodium bicarbonate, calcium carbonate, lithium phosphate, potassium phosphate, trisodium phosphate, disodium hydrogen phosphate, calcium phosphate, and calcium hydrogen phosphate. Examples of the organic alkali compound are ammonia, aliphatic amine, aromatic amine, aliphatic ammonium, aromatic ammonium, heterocyclic compounds, and their hydroxides, carbonates, and phosphates. More specific examples are ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethylammonium hydroxide, tetraethylammonium hydroxide, tetrapropylammonium hydroxide, tetrabutylammonium hydroxide, benzyltrimethylammonium hydroxide, pyridine, N,N-dimethyl-4-aminopyridine, ammonium carbonate, ammonium bicarbonate, and diammonium hydrogen phosphate.

The solvent for the alkali solution is not particularly limited, and water and/or an organic solvent can be used. A solvent having polarity (polar organic solvent such as water and an alcohol) is preferred, and an aqueous solvent including water is more preferred. Particularly preferred examples of the alkali solution are an aqueous sodium hydroxide solution and an aqueous potassium hydroxide solution.

The pH at 25° C. of the alkali solution with the ionic substituent-introduced cellulose dipped therein can be appropriately set and is preferably 9 or higher, more preferably 10 or higher, further preferably 11 or higher. This is because the yield of the cellulose fiber is further increased. In any case, the pH of the alkali solution at 25° C. is preferably 14 or lower. This is because a pH exceeding 14 reduces the handleability of the alkali solution.

In order to decrease the amount of the alkali solution used, the ionic substituent-introduced cellulose fiber may be washed before the alkali treatment step. Water and/or an organic solvent can be used in the washing. Also in order to improve handleability, the ionic substituent-introduced cellulose fiber thus alkali-treated may be washed with water and/or an organic solvent after the alkali treatment and before the nanofibrillation treatment mentioned below.

<Nanofibrillation (Defibration) Treatment>

For the nanofibrillation treatment, the cellulose fiber is dispersed in a solvent. The type of the solvent is not particularly limited as long as the nanofibrillation (also referred to as defibration) treatment is appropriately carried out. An aqueous solvent (water or a mixture of water and an organic solvent) can be used. Examples of the organic solvent include alcohols such as methanol, ethanol, n-propanol, isopropanol, n-butanol, and t-butyl alcohol. Further examples thereof include: ketones such as acetone and methyl ethyl ketone (MEK); ethers such as diethyl ether and tetrahydrofuran (THF); and dimethyl sulfoxide (DMSO), dimethylformamide (DMF), and dimethylacetamide (DMAc). One of these organic solvents may be used, or two or more thereof may be used.

The dispersion concentration is preferably 0.1 to 20% by mass, more preferably 0.5 to 10% by mass. This is because when the content is equal to or higher than the lower limit described above, the efficiency of the treatment is improved; and when the content is equal to or lower than the upper limit described above, clogging in the defibration treatment apparatus can be prevented.

The defibration treatment apparatus is not particularly limited. Examples thereof include a high-speed defibrillator, a grinder (stone mill-type crusher), a high-pressure homogenizer, an ultrahigh-pressure homogenizer, Clearmix, a high-pressure collision-type crusher, a ball mill, a bead mill, a disc-type refiner, and a conical refiner. Also, a wet milling apparatus such a twin-screw kneader, an oscillation mill, a homomixer under high-speed rotation, an ultrasonic disperser, or a beater can be appropriately used.

The average fiber width of the ultrafine cellulose fiber obtained by the nanofibrillation treatment is not particularly limited and can be, for example, 1 to 1000 nm, preferably 2 to 1000 nm, more preferably 2 to 500 nm, further preferably 3 to 100 nm. When the average fiber width of the ultrafine fiber is 1 nm or larger, the resulting ultrafine fiber sufficiently exerts its physical properties (strength, rigidity, and dimensional stability) because the dissolution of the molecule in water is suppressed. On the other hand, when the average fiber width is 1000 nm or smaller, the resulting ultrafine fiber easily exerts its features (high transparency, a high modulus of elasticity, a low linear expansion coefficient, and flexible properties). The obtained ultrafine cellulose fiber dispersion may contain cellulose fiber having a fiber width exceeding 1000 nm and preferably contains no cellulose fiber having a fiber width exceeding 1000 nm.

For purposes that require the relatively high transparency of ultrafine fiber, when the average fiber width is 30 nm or smaller, the resulting ultrafine fiber is less likely to cause the refraction and scattering of visible light at the interface in a laminate because of approaching 1/10 of the wavelength of the visible light, and tends to produce high transparency. Therefore, the average fiber width is not particularly limited and is preferably 2 to 30 nm, more preferably 2 to 20 nm. A laminate obtained from the ultrafine fiber as described above is generally a closely-packed structure and therefore has high strength. This laminate also produces high transparency because of the low scattering of visible light.

The average fiber width is measured as follows: Ultrafine fiber-containing slurry having a concentration of 0.05 to 0.1% by mass is prepared, and the slurry is casted onto a hydrophilized carbon film-coated grid to prepare a sample for TEM observation. If the sample contains wide fiber, SEM images of the surface of the slurry casted onto glass may be observed. The sample is observed using electron microscope images taken at a magnification of 1000×, 5000×, 10000×, 20000×, or 50000× according to the width of the constituent fiber. However, the sample, the observation conditions, and the magnification are adjusted so as to satisfy the following conditions:

(1) one straight line X is drawn at an arbitrary site in an observation image, and 20 or more fiber filaments intersect the straight line X; and (2) a straight line Y vertically intersecting the straight line in the same image is drawn, and 20 or more fiber filaments intersect the straight line Y.

The width of the fiber interlocking the straight line X and the straight line Y is visually read for observation images that satisfy the conditions described above. In this way, 3 or more images of at least surface portions that do not overlap with each other are observed, and the width of the fiber interlocking the straight line X and the straight line Y is read for each of the images. In this way, the fiber widths of at least 20 filaments x 2×3=120 filaments are read. The average fiber width is the average value of the fiber widths thus read.

The fiber length is not particularly limited and is preferably 0.1 μm or larger. The fiber length of 0.1 μm or larger is preferred because a sheet produced as mentioned later has sufficient tear strength. The fiber length can be determined by TEM, SEM, or AFM image analysis. The fiber length is a fiber length that accounts for 30% by mass or more of the ultrafine fiber.

The axial ratio (fiber length/fiber width) of the fiber is not particularly limited and is preferably in the range of 20 to 10000. The axial ratio of 20 or more is preferred because the ultrafine fiber-containing sheet is easy to form. The axial ratio of 10000 or less is preferred because the slurry viscosity is decreased.

The nanofibrillation treatment produces the ultrafine cellulose fiber dispersion (slurry) as mentioned above. The concentration of the ultrafine cellulose fiber in this dispersion is, for example, 0.1 to 20% by mass, and may be 0.5 to 10% by mass.

<Sheet Formation>

A sheet is prepared from the ultrafine cellulose fiber dispersion (slurry) obtained by the nanofibrillation treatment. The method for preparing the sheet is not particularly limited and can typically be based on, for example, a papermaking method or a coating method described below.

(Papermaking Method)

The ultrafine fiber-containing slurry can be subjected to papermaking by a papermaking method known in the art such as a continuous paper machine (e.g., a Fourdrinier type, a cylinder type, or an inclined type) which is used in ordinary papermaking, a multilayer paper machine as a combination thereof, or hand papermaking, and can be formed into a sheet by the same method as in general paper. Specifically, the ultrafine fiber-containing slurry can be filtered and dehydrated on a wire to obtain a sheet in a wet paper state, followed by pressing and drying to obtain a sheet. The concentration of the slurry is not particularly limited and is preferably 0.05 to 5% by mass. Too low a concentration requires a huge amount of time for filtration. On the other hand, too high a concentration does not produce a homogeneous sheet and is therefore not preferred. For the filtration and dehydration of the slurry, the filter fabric for use in the filtration is not particularly limited, and it is important that the ultrafine fiber does not pass through the filter fabric and the filtration rate is not too slow. Such a filter fabric is not particularly limited and is preferably a sheet, a woven fabric, or a porous membrane made of an organic polymer. The organic polymer is not particularly limited and is preferably a non-cellulosic organic polymer such as polyethylene terephthalate, polyethylene, polypropylene, or polytetrafluoroethylene (PTFE). Specific examples thereof include, but are not particularly limited to, a porous membrane of polytetrafluoroethylene having a pore size of 0.1 to 20 µm, for example, 1 µm, and a woven fabric of polyethylene terephthalate or polyethylene having a pore size of 0.1 to 20 µm, for example, 1 µm.

(Coating Method)

The coating method is a method which involves coating a base material with the ultrafine fiber-containing slurry, drying the resultant, and detaching the formed ultrafine fiber-containing layer from the base material to obtain a sheet. The method can continuously produce sheets by using a coating apparatus and a long base material. The property of the base material is not particularly limited, and a base material having higher wettability against the ultrafine fiber-containing slurry is more preferred because the contraction or the like of the sheet during drying can be suppressed. It is preferred to select a base material that allows the formed sheet to be easily detached after drying. Among others, a resin plate or a metal plate is preferred, though the base material is not particularly limited thereto. Such appropriate base materials are preferably used each alone or in a stacked form. Examples of the base material that can be used include, but are not particularly limited to: resin plates such as acrylic plates, polyethylene terephthalate plates, vinyl chloride plates, polystyrene plates, and polyvinylidene chloride plates; metal plates such as aluminum plates, zinc plates, copper plates, and iron plates; plates obtained by the oxidation treatment of their surface; and stainless plates and brass plates. Various coaters capable of coating the base material with a predetermined amount of the slurry can be used for coating the base material with the ultrafine fiber-containing slurry. For example, a roll coater, a gravure coater, a die coater, a curtain coater, a spray coater, a blade coater, a rod coater, or an air doctor coater can be used, though the coater is not particularly limited thereto. Among them, a coating manner such as a die coater, a curtain coater, a spray coater, or an air doctor coater is effective for uniform coating. In the case of, for example, preparing the sheet into a laminate as mentioned later, the detachment from the base material may not be carried out.

(Amount of Slurry)

The thickness of the sheet to be prepared is not particularly limited and can be appropriately set according to purposes. The amount of the slurry can be measured on the basis of the finished basis weight or thickness of the sheet to carry out papermaking or coating, etc.

(Dehydration and Drying)

After the papermaking or the coating, etc., dehydration and/or drying is carried out, if necessary, to form a sheet. The dehydration or the drying can be carried out until moisture is removed to some extent because treatment with a solution of a strong acid-derived salt of a divalent or higher metal is carried out in a subsequent step. It is considered that the dehydration or the drying does not have to be completely performed as in the case of obtaining a usual sheet as a final product. Examples of the dehydration method include, but are not particularly limited to, a dehydration method usually used for paper production. A method which involves dehydration with, for example, a Fourdrinier, cylinder, or inclined wire and then dehydration with a roll press is preferred. Examples of the drying method include, but are not particularly limited to, a method for use in paper production. For example, a method such as a cylinder dryer, a yankee dryer, hot air drying, or an infrared heater is preferred.

The drying method is not particularly limited, and any of a contactless drying method and a method of drying the sheet while locking the sheet can be used, or these methods may be combined.

The contactless drying method is not particularly limited, and a method for drying by heating with hot air, infrared radiation, far-infrared radiation, or near-infrared radiation (drying method by heating) or a method for drying in vacuum (vacuum drying method) can be utilized. Although the drying method by heating and the vacuum drying method may be combined, the drying method by heating is usually utilized. The drying with infrared radiation, far-infrared radiation, or near-infrared radiation can be performed using an infrared apparatus, a far-infrared apparatus, or a near-infrared apparatus without particular limitations. The heating temperature for the drying method by heating is not particularly limited and is preferably 40 to 120° C., more preferably 40 to 105° C. At the heating temperature equal to or higher than the lower limit described above, the dispersion medium can be rapidly volatilized. At the heating temperature equal to or lower than the upper limit described above, cost required for the heating can be reduced and the thermal discoloration of the ultrafine fiber can be suppressed.

(Additional Fiber)

For the preparation of the sheet, the sheet is not particularly limited and can also be prepared by mixing the ultrafine fiber with at least one or more fibers other than the ultrafine fiber (hereinafter, referred to as "additional fiber"). Examples of the additional fiber include, but are not particularly limited to, inorganic fiber, organic fiber, synthetic fiber, semisynthetic fiber, and regenerated fiber. Examples of the inorganic fiber include, but are not limited to, glass fiber, rock fiber, and metal fiber. Examples of the organic fiber include, but are not limited to, natural product-derived fiber such as cellulose, carbon fiber, pulp, chitin, and chitosan. Examples of the synthetic fiber include, but are not limited to, nylon, vinylon, vinylidene, polyester, polyolefin (e.g., polyethylene and polypropylene), polyurethane, acryl, polyvinyl chloride, and aramid. Examples of the semisynthetic fiber include, but are not limited to, acetate, triacetate, and promix. Examples of the regenerated fiber include, but are not limited to, rayon, cupra, polynosic rayon, lyocell, and Tencel. The additional fiber can be subjected, if necessary, to a treatment such as chemical treatment or defibration treatment.

The mixing is not particularly limited and can be carried out, for example, by adding the additional fiber to the ultrafine fiber-containing slurry before papermaking or coating. In the case of subjecting the additional fiber to a treatment such as chemical treatment or defibration treatment, the additional fiber may be subjected to the treatment such as chemical treatment or defibration treatment after being mixed with the ultrafine fiber, or may be mixed with the ultrafine fiber after being subjected to the treatment such as chemical treatment or defibration treatment. The mixing of the ultrafine fiber and the additional fiber having similar average fiber diameters is preferred because of further facilitating uniform mixing.

For the mixing with the additional fiber, the amount of the additional fiber added with respect to the total amount of the ultrafine fiber and the additional fiber is not particularly limited and is preferably 50% by mass or smaller, more preferably 40% by mass or smaller, further preferably 30% by mass or smaller, particularly preferably 20% by mass or smaller.

A hydrophilic polymer may be added for the preparation of the sheet. Examples of the hydrophilic polymer can include, but are not particularly limited to, polyethylene glycol, cellulose derivatives (hydroxyethylcellulose, carboxyethylcellulose, carboxymethylcellulose, etc.), casein, dextrin, starch, modified starch, polyvinyl alcohol, modified polyvinyl alcohol (acetoacetylated polyvinyl alcohol, etc.), polyethylene oxide, polyvinylpyrrolidone, polyvinyl methyl ether, polyacrylate salts, polyacrylamide, acrylic acid alkyl ester copolymers, and urethane copolymers.

Also, a hydrophilic low-molecular compound can be used instead of the hydrophilic polymer. Examples of the hydrophilic low-molecular compound can include, but are not particularly limited to, glycerin, erythritol, xylitol, sorbitol, galactitol, mannitol, ethylene glycol, diethylene glycol, propylene glycol, dipropylene glycol, and butylene glycol.

The mixing of the hydrophilic polymer or the hydrophilic low-molecular compound is not particularly limited and can be carried out, for example, by adding the hydrophilic polymer or the hydrophilic low-molecular compound to the ultrafine fiber-containing slurry before papermaking or coating. For the addition of the hydrophilic polymer or the hydrophilic low-molecular compound, the amount of the hydrophilic polymer or the hydrophilic low-molecular compound added is not particularly limited and is preferably 1 to 200 parts by mass, more preferably 1 to 150 parts by mass, further preferably 2 to 120 parts by mass, particularly preferably 3 to 100 parts by mass, with respect to 100 parts by mass (solid content) of the ultrafine fiber.

<Treatment Using Divalent or Higher Metal>

In the present invention, in the step (2), the ultrafine fiber having an ionic substituent is treated with a solution of a strong acid-derived salt of a divalent or higher metal. The metal may be in any of ion, element (atom), and compound states unless otherwise specified. When the sheet comprises a metal, the metal is present in, for example, an ion, element (atom), or compound state, in the sheet and can be analyzed by fluorescent X-ray analysis. The divalent or higher metal is preferably a divalent metal or a trivalent metal. Examples of the divalent metal atom are magnesium (Mg), calcium (Ca), nickel(II) (Ni(II)), cobalt(II) (Co(II)), copper(II) (Cu(II)), manganese (Mn), iron(II) (Fe(II)), lithium (Li), vanadium(II) (V(II)), zirconium (Zr), and zinc (Zn). Examples of the trivalent metal are aluminum (Al) and iron(III) (Fe(III)). Among them, aluminum, magnesium, calcium, copper, iron, and zinc are more preferred, and aluminum, magnesium, and zinc are particularly preferred, from the viewpoint of, for example, improving strength in a wet state. Only one of these metals may be used, or two or more thereof may be used.

The divalent or higher metal is used as a solution of a water-soluble strong acid-derived salt in the treatment of the sheet. The strong acid-derived salt refers to a salt derived from sulfuric acid, hydrochloric acid, or nitric acid. The aqueous solution of the salt exhibits weak acidity to strong acidity. A salt having high solubility in water is preferably used. Specific examples of such a metal salt can include aluminum sulfate, magnesium sulfate, potassium aluminum sulfate, aluminum ammonium sulfate, and ferric sulfate. Aluminum sulfate and magnesium sulfate are preferred.

The treatment method is not particularly limited. The treatment method can be carried out, for example, by dipping the sheet obtained by the step mentioned above in a solution containing the strong acid-derived salt of the divalent or higher metal dissolved in an appropriate solvent for several minutes to several hours. The solvent is not particularly limited as long as the strong acid-derived salt of the divalent or higher metal used is dissolved therein. Water or an aqueous solvent containing water is preferably used. The dipping ratio can be appropriately set, and, for example, 1 to 100 parts by mass, preferably 1.5 to 50 parts by mass, of the solution can be used with respect to 1 part by mass of the sheet.

The amount of the metal salt used is preferably an amount that permits formation of ion pairs with most of ionic substituents introduced in the sheet. For example, the metal salt can be used in an amount that permits formation of ion pairs with at least 50% or more, preferably 60% or more, more preferably 70% or more, further preferably 80% or more, still further preferably 90% or more, of ionic substituents of introduced substituents. Alternatively, when the ionic substituent is a phosphoric acid group, 0.3 to 3.0 mmol, preferably 0.2 to 2.0 mmol, more preferably 0.5 to 1.5 mmol, of a trivalent metal salt can be used with respect to 1 mmol of the phosphoric acid group. In the case of using a different group or a different salt, those skilled in the art can appropriately determine a sufficient amount of the group or the salt in terms of chemical equivalent on the basis of the amounts described above about the phosphoric acid group and the trivalent metal salt in consideration of valence.

The concentration of the strong acid-derived salt of the divalent or higher metal in the solution can be 0.05% or higher and is preferably 0.1% or higher, more preferably 0.15% or higher, though depending on the solubility of the salt used in water. The upper limit may be determined from the economic standpoint, and is preferably 15% or lower, more preferably 10% or lower, from the viewpoint of securing the transparency of the sheet.

After the treatment with the metal salt, a sheet can be obtained as a final product by washing and/or dehydration and/or drying, if necessary. The washing can be carried out with water or an aqueous solvent, preferably water. The dehydration and/or the drying can be carried out by the method described in the paragraph of sheet formation mentioned above.

It is considered that the treatment using the solution of the strong acid-derived salt of the divalent or higher metal forms ion pairs between the resulting divalent or higher metal ions and ionic groups of substituents on the sheet so that an insoluble or poorly soluble (non-hydrophilic) cross-linked structure is formed. It is considered that this increases the water proofness of the sheet and improves strength under wet conditions. In the present invention, a formed sheet is treated with the solution of the strong acid-derived salt. This treatment of the sheet produces high transparency. The studies by the present inventors have revealed that when slurry before sheet formation is treated with the solution of the strong acid-derived salt, followed by sheet formation, this sheet formation reduces transparency.

<Treatment Using Weak Acid Salt>

In the step (3), the sheet obtained in the step (2) is further treated with a solution of a salt of a weak acid and a strong base. In the present invention, the step (3) may or may not be carried out.

The weak acid refers to an acid having a larger acid dissociation constant (pKa) than that of the strong acid constituting the strong acid-derived salt of the divalent or higher metal used in the step (2), for example, formic acid, acetic acid, or carbonic acid. The strong base refers to a base having a base dissociation constant pKb of pKb<0 (or Kb>1) and is typically a hydroxide of an alkali metal, a tetraalkylammonium, or an alkaline earth metal. More specifically, the strong base is a hydroxide of lithium, sodium, potassium, rubidium, cesium, tetramethylammonium, calcium, strontium, barium, europium, thallium, or guanidine. A preferred example thereof is a hydroxide of sodium, potassium, or calcium.

The salt of the weak acid and the strong base is used as a solution of a salt with the water-soluble strong base in the treatment of the sheet. A metal salt having high solubility in water is preferably used as the salt of the weak acid and the strong base. Specific examples of such a metal salt are sodium acetate, sodium citrate, sodium lactate, sodium malate, sodium tartrate, calcium acetate, sodium bicarbonate, potassium acetate, potassium bicarbonate, sodium carbonate, potassium carbonate, and disodium hydrogen phosphate. Only one of these salts of the weak acids and the strong bases may be used, or two or more thereof may be used.

The treatment method is not particularly limited. The treatment method can be carried out, for example, by dipping the sheet obtained by the step (2) mentioned above in a solution containing the salt of the weak acid and the strong base dissolved in an appropriate solvent for several minutes to several hours. The solvent is not particularly limited as long as the salt used is dissolved therein. Water or an aqueous solvent containing water is preferably used. The dipping ratio can be appropriately set, and, for example, 1 to 100 parts by mass, preferably 1.5 to 50 parts by mass, of the solution can be used with respect to 1 part by mass of the sheet.

The amount of the salt used is preferably an amount that permits dissociation, from the sheet, of an anion (e.g., a hydrogen sulfate ion $HSO_4^-$) derived from the strong acid-derived salt of the divalent or higher metal of the step (2), probably introduced in the sheet. When the ionic substituent is, for example, a phosphoric acid group, 0.1 to 1.0 mmol, preferably 0.13 to 1.3 mmol, more preferably 0.16 to 0.5 mmol, of a salt that generates a monovalent weak acid ion (e.g., an acetic acid ion $CH_3COO^-$ or a hydrogen carbonate ion $HCO_3^-$) may be used with respect to 1 mmol of the phosphoric acid group. In the case of using a different salt, those skilled in the art can appropriately determine a sufficient amount of the salt in terms of chemical equivalent on the basis of the amount described above about the case of generating the monovalent weak acid ion in consideration of the valence of the weak acid ion to be generated.

The concentration of the salt in the solution can be 0.1% or higher and is preferably 0.5% or higher, more preferably 1.0% or higher, though depending on the solubility of the salt used in water. The upper limit may be determined from the economic standpoint, and is preferably 35% or lower, more preferably 30% or lower.

After the treatment with the salt, a sheet can be obtained as a final product by washing and/or dehydration and/or drying, if necessary. The washing can be carried out with water or an aqueous solvent, preferably water. The dehydration and/or the drying can be carried out by the method described in the paragraph of sheet formation mentioned above.

The treatment in the step (3) using the solution of the salt of the weak acid and the strong base can dissociate an anion (e.g., $HSO_4^-$) derived from the strong acid-derived salt of the divalent or higher metal of the step (2), probably introduced in the sheet. It is considered that this can suppress the oxidative decomposition of fiber by a strong acid-derived anion and suppresses the yellowing of the resulting sheet.

In the case of introducing a phosphoric acid group as the ionic substituent to the OH group of the cellulose raw material using a sodium salt of phosphoric acid, the state after the introduction is represented by cellulose-O—P(=O)(—O$^-$Na$^+$)(—O$^-$Na$^+$). After treatment of this sheet with the strong acid-derived salt of the divalent or higher metal, a hydrophilic group (—O$^-$H$^+$) of a H-type ionic substituent is present at an uncross-linked site. In this state, a frame retardant mechanism unique to the phosphoric acid group emerges in a high-temperature and humidity environment, promoting char formation. This facilitates browning. Therefore, it is considered that the sheet treated with the strong acid-derived salt of the divalent or higher metal is further treated with the salt of the weak acid and the strong base, whereby the hydrophilic group of the H-type ionic substituent is rendered salt-type (e.g., —O$^-$Na$^+$) and is reduced so that char formation at a high temperature can be suppressed. It is considered that the yellowing of the resulting sheet is suppressed owing to these effects.

[Structure and Properties of Sheet]

Next, a structure and properties as a sheet itself (object) will be described about the sheet obtained by the production method mentioned later.

<Total Light Transmittance>

The total light transmittance of the sheet refers to a value measured according to JIS K7361 using a haze meter.

The total light transmittance of the sheet provided by the present invention is preferably 80% or higher, more preferably 85% or higher, further preferably 90% or higher.

<Haze Value>

The haze value of the sheet refers to a value measured according to JIS K7136 using a haze meter. The haze value of the sheet of the first aspect provided by the present invention is 10.0% or less, preferably 8.0% or less, more preferably 6.0% or more. The haze value of the sheet of the second aspect provided by the present invention is preferably 10.0% or less, more preferably 8.0% or less, further preferably 6.0% or more.

Such a low haze value can be attained in the sheet obtained by the present invention, probably because of the following factor: the treatment with the solution of the strong acid-derived salt of the divalent or higher metal is carried out, and this treatment is carried out after sheet formation, not in a slurry state (this can prevent reduction in the transparency of the sheet which is observed in the case of treating slurry before sheet formation with a solution of a strong acid-derived salt). Furthermore, the type of the substituent to be introduced to the fiber, optionally the amount of the substituent introduced, the type of the metal (or the metal salt for use in the treatment), and optionally the amount thereof are appropriately selected.

<Change in Yellowness>

Change in the degree of yellowing (ΔYI) of the sheet is represented by the following expression:

$$\Delta YI = YI_2 - YI_1$$

wherein $YI_1$ represents yellowness before vacuum drying at 200° C. for 4 hours, and $YI_2$ represents yellowness after the vacuum drying at 200° C. for 4 hours. The yellowness refers to a value measured according to JIS K7373.

Change in the degree of yellowing (ΔYI) of the sheet of the second aspect provided by the present invention satisfies the following expression (1):

$$\Delta YI = YI_2 - YI_1 \leq 20 \tag{1}$$

The change in the degree of yellowing (ΔYI) is preferably 15 or less. The change in yellowness is thus suppressed in the sheet obtained by the present invention, probably because of the following factor: the treatment in the step (3) using the solution of the salt of the weak acid and the strong base can dissociate an anion (e.g., $HSO_4^-$) derived from the strong acid-derived salt of the divalent or higher metal of the step (2), probably introduced in the sheet, and suppress the oxidative decomposition of fiber. In the case of a phosphoric acid group-introduced sheet, a hydrophilic group ($—O^-H^+$) of a H-type ionic substituent present after the treatment with the strong acid-derived salt of the divalent or higher metal is rendered salt-type (e.g., $—O^-Na^+$) and is reduced by the treatment with the strong acid-derived salt of the divalent or higher metal so that char formation at a high temperature is suppressed. For the further treatment of the sheet treated with the strong acid-derived salt of the divalent or higher metal, with the salt of the weak acid and the strong base, the concentration of the salt and optionally the type thereof are appropriately selected.

<Amount of Divalent or Higher Metal Introduced>

The amount of the divalent or higher metal introduced (mmol/g) in the sheet can be measured as follows, for example, by use of a fluorescent X-ray analysis method.

First, for calibration curve preparation, a sample (e.g., filter paper is used) having composition and morphology similar to those of the sheet to be measured and having a known content of the analytical element (mmol) is prepared, and the X-ray intensity of the sample is measured by fluorescent X-ray analysis. In this context, the divalent or higher metal serves as the analytical element. Subsequently, a calibration curve is prepared on the basis of the X-ray intensity thus obtained, and the known content of the analytical element. Subsequently, the X-ray intensity of the sheet to be measured is measured by fluorescent X-ray analysis. Subsequently, the content of the analytical element (mmol) in the sheet to be measured is determined from the X-ray intensity thus obtained and the calibration curve described above. Subsequently, the obtained content of the analytical element in the sheet to be measured is divided by the mass (g) of the sheet to be measured to calculate the amount of the divalent or higher metal introduced (mmol/g) in the sheet to be measured. In this context, a mass Z of the sheet to be measured is represented by Z (g)=W (cm$^2$)×X (g/cm$^3$)×Y (cm) (W: the area (cm$^2$) of the sheet used in the fluorescent X-ray analysis, X: the density (g/cm$^3$) of the sheet, Y: the thickness (cm) of the sheet).

The amount of the divalent or higher metal introduced in the sheet provided by the present invention is an amount effective for improving the strength of the sheet under wet conditions. The effective amount can be, for example, 0.10 mmol/g (per sheet) or larger and is more preferably 0.25 mmol/g (per sheet) or larger. When the ionic substituent of the ultrafine fiber is a phosphoric acid-derived group, the amount of the divalent or higher metal introduced is, for example, more preferably 0.50 mmol/g (per sheet) or larger, particularly preferably 0.80 mmol/g (per sheet) or larger. In the case of introducing a phosphoric acid-derived group to the ultrafine fiber and introducing aluminum as the divalent or higher metal, the amount of aluminum introduced is, for example, particularly preferably 1.0 mmol/g (per sheet) or larger. This is because the sheet having such a value exhibits improved tensile strength and modulus of elasticity without being swollen and broken even under wet conditions. On the other hand, the amount of the divalent or higher metal introduced can be, for example, 3.0 mmol/g (per sheet) or smaller and is more preferably 2.5 mmol/g (per sheet) or smaller, particularly preferably 2.0 mmol/g (per sheet) or smaller. This can more effectively improve transparency.

The sheet of the first aspect provided by the present invention may contain at least one element selected from the group consisting of sulfur, chlorine, and nitrogen derived from the strong acid (sulfuric acid, hydrochloric acid, or nitric acid) used because the strong acid-derived salt of the divalent or higher metal salt is used in the production process. The amount of such an element is, for example, 0.01 mmol/g (per sheet) to 0.10 mmol/g (per sheet), though depending on the type and amount of the ionic substituent and the amount of the strong acid-derived salt used. In this context, the amounts of sulfur, chlorine, and nitrogen in the sheet can be measured, for example, by use of a fluorescent X-ray analysis method. In the present embodiment, the amounts of sulfur, chlorine, and nitrogen in the sheet can be measured, for example, by changing the analyte in the aforementioned method for measuring the amount of the divalent or higher metal introduced to sulfur, chlorine, or nitrogen.

<Strong Acid-Derived Anion>

As described above, it is considered that an anion (e.g., $HSO_4^-$) derived from the strong acid-derived salt remains in the sheet due to use of the strong acid-derived salt of the divalent or higher metal in the step (2). According to the studies by the present inventors, the strong acid-derived anion remaining in the sheet cannot be removed even by repeated washing and is therefore presumed to be chemically bonded. In the case of carrying out the step (3) in the present invention, the strong acid-derived anion remaining in the sheet is removed by the step (3). Therefore, the strong acid-derived anion is very few or is not detected in the resulting sheet.

The strong acid-derived anion in the sheet is, for example, $HSO_4^-$, and $HSO_4^-$ can be analyzed as a sulfur element. In this context, the amount of sulfur in the sheet can be measured, for example, by use of a fluorescent X-ray analysis method. In the present embodiment, the amount of sulfur in the sheet can be measured, for example, by changing the analyte in the aforementioned method for measuring the amount of the divalent or higher metal introduced to sulfur.

When the ultrafine fiber has one or two or more ionic substituents selected from the group consisting of a phosphoric acid-derived group and a carboxylic acid-derived group, the amount of sulfur in the sheet is smaller than 0.02 mmol/g (per sheet). The amount of sulfur is preferably 0.01 mmol/g (per sheet) or smaller. More preferably, sulfur is not detected. This is because such an amount is effective for suppressing the oxidative decomposition of cellulose and suppressing yellowing. A value or smaller as to a content in the sheet also includes the case of being not detected.

<Strong Base-Derived Alkali Metal, Etc.>

In the case of carrying out the step (3) in the present invention, it is considered that a hydrophilic group (e.g., —O⁻H⁺) of a H-type substituent after the treatment of the step (2) is rendered salt-type (e.g., —O⁻Na⁺) by use of the salt of the weak acid and the strong base in the step (3).

The salt type can be analyzed as the presence of a strong base-derived element, for example, an alkali metal element or an alkaline earth metal element. In this context, the amount of the alkali metal element or the alkaline earth metal in the sheet can be measured, for example, by a fluorescent X-ray analysis method. In the present embodiment, the amount of the alkali metal or the alkaline earth metal in the sheet can be measured, for example, by changing the analyte in the aforementioned method for measuring the amount of the divalent or higher metal introduced to the alkali metal or the alkaline earth metal.

The amount of the alkali metal in the sheet is, for example, 0.05 mmol/g (per sheet) or larger, though depending on the amount of the substituent introduced or the divalent or higher metal used. The amount of the alkali metal is preferably 0.10 mmol/g (per sheet) or larger, more preferably 0.20 mmol/g (per sheet) or larger. This is because this value or larger can prevent carbide from being generated by heating and is effective for suppressing discoloration. On the other hand, the amount of the alkali metal can be, for example, 5.0 mmol/g (per sheet) or smaller and is more preferably 2.5 mmol/g (per sheet) or smaller, particularly preferably 1.0 mmol/g (per sheet) or smaller. In the case of measuring the amount of an element other than the alkali metal, those skilled in the art can determine its content in the sheet on the basis of the content of the alkali metal mentioned above in consideration of chemical equivalent. The amount of the alkaline earth metal (divalent) is 0.02 mmol/g (per sheet) or larger. The amount of the alkaline earth metal (divalent) is preferably 0.05 mmol/g (per sheet) or larger, more preferably 0.10 mmol/g (per sheet) or larger. On the other hand, the amount of the alkaline earth metal can be, for example, 1.0 mmol/g (per sheet) or smaller and is more preferably 0.5 mmol/g (per sheet) or smaller, particularly preferably 0.25 mmol/g (per sheet) or smaller.

<Tensile Strength and Tensile Modulus of Elasticity>

The tensile strength and the tensile modulus of elasticity of the sheet refer to values measured according to JIS P 8135 under wet conditions using a tensile tester. The wet conditions mean that the target sheet is dipped in ion-exchange water for 24 hours and then used as a test specimen. The sheet obtained by the present invention has high transparency and is excellent in tensile strength and the tensile modulus of elasticity under wet conditions as compared with a sheet untreated with the divalent or higher metal ion. Specifically, the tensile strength under wet conditions of the sheet provided by the present invention is 10.0 MPa or higher, preferably 15.0 MPa or higher. This is because this value or higher allows the sheet to endure use as a packaging material. The upper limit is not particularly limited and is, for example, 200.0 MPa or lower or 100.0 MPa or lower. The modulus of elasticity under wet conditions of the sheet provided by the present invention is 0.7 GPa or higher, preferably 1.0 GPa or higher. This is because this value or higher allows the sheet to endure use as a packaging material. The upper limit is not particularly limited and is, for example, 10.0 GPa or lower or 5.0 GPa or lower.

<Water Absorption Rate>

The water absorption rate of the sheet refers to a rate (%) determined by dipping a sheet of 50 mm square in ion-exchange water for 24 hours and calculating the rate from the ratio of the mass of the dipped sheet to the absolute dry mass of the sheet. The absolute dry mass refers to the mass of the target dried at 105° C. for 24 hours. The sheet obtained by the present invention has high transparency and has a low water absorption rate as compared with a sheet untreated with the divalent or higher metal ion. Specifically, the water absorption rate of the sheet provided by the present invention is 500% or lower, preferably 350% or lower, more preferably 200% or lower. This is because this value or lower allows the sheet to endure use as a packaging material. The lower limit is not particularly limited and is, for example, 10% or higher or 50% or higher.

<Density>

The density of the sheet refers to a value (g/cm³) determined by subjecting a sheet of 50 mm square to moisture control under conditions of 23° C. and 50% RH for 24 hours and then calculating the density from the thickness and mass of the resulting sheet. The density of the sheet obtained by the present invention can be appropriately set according to purposes, etc. The density of the sheet can be 0.1 to 7 g/cm³ and is preferably 0.5 to 5 g/cm³, more preferably 1.0 to 3 g/cm³, in consideration of strength and/or transparency, etc.

[Stacking of Sheet, Purpose, and Others]

The sheet provided by the present invention may be used as an object consisting of one layer of the sheet or may be used as a laminate by forming an organic layer and/or an inorganic layer on at least one face. The stacking can further confer resistance to water (water proofness, moisture resistance, and water repellency). In the case of stacking the inorganic layer and the organic layer thereon, the order is not particularly limited. It is preferred that the organic layer should be first stacked on the surface of the base sheet, because the face for forming the inorganic layer can be smoothened and the inorganic layer to be formed can have fewer defects. The composite sheet may also comprise an additional constituent layer other than the organic layer and the inorganic layer, for example, an easily adhesive layer for facilitating the adhesion of an upper layer. In the case of using the sheet for purposes that place special emphasis on transparency, it is preferred that the stacking should not involve a heating step or a UV irradiation step, which usually accelerates yellowing. The laminate obtained by the stacking preferably comprises at least one inorganic layer and at least one organic layer formed on at least one side of a base sheet layer consisting of the ultrafine fiber-containing sheet. The number of layers including the inorganic layer, the organic layer, etc., is not particularly limited. For example, 2 to 15 alternated layers of the inorganic layer and the organic layer are preferably stacked, and 3 to 7 alternated layers thereof are more preferably stacked, on one side from the viewpoint of attaining adequate moisture resistance while maintaining flexibility and transparency.

Examples of the substance constituting the inorganic layer include, but are not particularly limited to: aluminum, silicon, magnesium, zinc, tin, nickel, and titanium; their oxides, carbides, nitrides, oxycarbides, oxynitrides, and oxycarbonitrides; and mixtures thereof. Silicon oxide, silicon nitride, silicon oxycarbide, silicon oxynitride, silicon oxycarbonitride, aluminum oxide, aluminum nitride, aluminum oxycarbide, aluminum oxynitride, or a mixture thereof is preferred from the viewpoint that high moisture barrier properties can be stably maintained.

Examples of the resin that is used for forming the organic layer include, but are not particularly limited to, epoxy resins, acrylic resins, oxetane resins, silsesquioxane resins, phenol resins, urea resins, melamine resins, unsaturated polyester resins, silicon resins, polyurethane resins, silsesquioxane resins, and diallyl phthalate resins. For obtaining a low-water-absorbing laminate, it is preferred that the resin should have a small content of a hydrophilic functional group such as a hydroxy group, a carboxyl group, or an amino group.

The sheet and the laminate provided by the present invention are excellent in transparency and have strength even under high-humidity conditions. Therefore, the sheet and the laminate are suitable for use as a packaging material for foods, cosmetics, pharmaceuticals, personal computers, home electronics, and the like by exploiting properties such as a light weight.

Furthermore, the sheet and the laminate provided by the present invention are excellent in optical properties and are therefore suitable for use as a display element, a lighting element, a solar cell, or a window material, or a panel or a substrate therefor.

More specifically, the sheet and the laminate (hereinafter, referred to as a laminate, etc.) are suitable for use as a display such as a flexible display, a touch panel, a liquid crystal display, a plasma display, an organic EL display, a field emission display or a display for rear-projection television, or a LED element. Also, the laminate, etc. is suitable for use as a substrate for solar cells such as silicon solar cells and dye-sensitized solar cells. For purposes as the substrate, a barrier film, ITO, TFT, or the like may be stacked thereon. Furthermore, the laminate, etc. is suitable for use as a window material for automobiles, rail vehicles, aircrafts, houses, office buildings, factories, and the like. For the window material, a film such as a fluorine coating or a hard coat film, or an impact-resistant or light-resistant material may be stacked thereon, if necessary.

The laminate, etc. can also be used as a structural material for purposes other than transparent materials by exploiting properties such as a low linear expansion rate, high elasticity, high strength, and a light weight. Particularly, the laminate, etc. can be preferably used as a material for automobiles, rail vehicles, or aircrafts, such as glazing, an interior material, an outer panel, or a bumper, a case for personal computers, a component for home electronics, a material for packaging, a building material, a construction material, a fishery material, other industrial materials, and the like.

The laminate, etc. can be used in various products. Examples of the product can include various products such as: computers, tablet terminals, and mobile phones using the display elements or the displays mentioned above; electric bulbs, lightings (lighting devices and lighting apparatuses), guidance lights, backlights for liquid crystal panels, flashlights, headlamps for bicycles, interior lights and meter lamps for automobiles, traffic light machines, altitude lightings within or without buildings, home lightings, school lightings, medical lightings, factory lightings, lights for plant growth, illumination for video lightings, lightings for around-the-clock or late-night shops such as convenience stores, and illuminating lamps for refrigerators or freezers using the lighting elements; and houses, buildings, automobiles, rail vehicles, aircrafts, and home electronics using the window materials or the structural materials.

Hereinafter, the present invention will be described with reference to Examples. However, the scope of the present invention is not intended to be limited by Examples.

EXAMPLES

Example A1

<Preparation of Phosphoric Acid Group-Introduced Cellulose Fiber>

Pulp manufactured by Oji Paper Co., Ltd. (solid content: 93%, basis weight: 208 g/m², sheet-shaped, Canadian Standard Freeness (CSF) measured according to JIS P 8121 after defibration: 700 ml) was used as softwood kraft pulp. 100 parts by mass (absolute dry mass) of the softwood kraft pulp were impregnated with a mixed aqueous solution of ammonium dihydrogen phosphate and urea and were compressed so as to be 49 parts by mass of the ammonium dihydrogen phosphate and 130 parts by mass of the urea to obtain chemical-impregnated pulp. The obtained chemical-impregnated pulp was dried in a dryer of 105° C. for moisture evaporation to predry the chemical-impregnated pulp. Then, the chemical-impregnated pulp was heated in an air-blow dryer set to 140° C. for 10 minutes so that the phosphoric acid group was introduced to cellulose in the pulp to obtain phosphorylated pulp. 10000 parts by mass of ion-exchange water were poured to 100 parts by mass (absolute dry mass) of the obtained phosphorylated pulp, which was then uniformly dispersed by stirring, followed by filtration and dehydration to obtain a dehydrated sheet. This step was repeated twice to obtain phosphoric acid-modified cellulose fiber. The amount of the phosphoric acid group introduced in the obtained phosphoric acid-modified cellulose fiber was 0.98 mmol/g.

<Machine Process>

After washing and dehydration, ion-exchange water was added to the obtained pulp to prepare a pulp suspension having a concentration of 1.0% by mass. This pulp suspension was passed through a wet atomization apparatus (manufactured by Sugino Machine Ltd.; Ultimizer) five times at a pressure of 245 MPa to obtain ultrafine cellulose fiber suspension.

<Sheet Formation>

Polyethylene glycol (manufactured by Wako Pure Chemical Industries, Ltd.; molecular weight: 4,000,000) was added to the ultrafine cellulose fiber suspension so as to be 20 parts by mass with respect to 100 parts by mass of the ultrafine cellulose fiber. The concentration was adjusted to 0.5% by mass in terms of solid concentration. The suspension was measured such that the finished basis weight of a sheet was 45 g/m². The suspension was developed to a commercially available acrylic plate and dried in a chamber of 35° C. and 15% RH. A plate for damming was disposed on the acrylic plate so as to achieve the predetermined basis weight. The sheet was obtained by these procedures and had a thickness of 30 μm.

<Cross-Linking of Ultrafine Cellulose Fiber>

The ultrafine cellulose fiber sheet was dipped for 30 minutes in an aqueous solution having an aluminum sulfate pure content of 1%, prepared using aluminum sulfate tetradecahydrate to octadecahydrate (manufactured by Kanto Chemical Co., Inc.), to perform cross-linking treatment with aluminum. This sheet was dipped in ion-exchange water for 15 minutes for washing. The washing was repeated twice. Then, the sheet was attached to an acrylic plate and dried in a chamber of 35° C. and 15% RH.

Example A2

A sheet was obtained in the same way as in Example A1 except that the concentration of the aluminum sulfate in the aqueous solution was changed to 5%.

Example A3

A sheet was obtained in the same way as in Example A1 except that the concentration of the aluminum sulfate in the aqueous solution was changed to 10%.

Example A4

A sheet was obtained in the same way as in Example A1 except that the concentration of the aluminum sulfate in the aqueous solution was changed to 15%.

Example A5

Pulp manufactured by Oji Paper Co., Ltd. (solid content: 93%, basis weight: 208 g/m$^2$, sheet-shaped, Canadian Standard Freeness (CSF) measured according to JIS P 8121 after defibration: 700 ml) was used as softwood kraft pulp. 100 parts by mass (absolute dry mass) of the softwood kraft pulp were impregnated with a mixed aqueous solution of ammonium dihydrogen phosphate and urea and were compressed so as to be 49 parts by mass of the ammonium dihydrogen phosphate and 130 parts by mass of the urea to obtain chemical-impregnated pulp. The obtained chemical-impregnated pulp was dried in a dryer of 105° C. for moisture evaporation to predry the chemical-impregnated pulp. Then, the chemical-impregnated pulp was heated in an air-blow dryer set to 140° C. so that the phosphoric acid group was introduced to cellulose in the pulp to obtain phosphorylated pulp. 10000 parts by mass of ion-exchange water were poured to 100 parts by mass (absolute dry mass) of the obtained phosphorylated pulp, which was then uniformly dispersed by stirring, followed by filtration and dehydration to obtain a dehydrated sheet. This step was repeated twice to obtain phosphoric acid-modified cellulose fiber having a high amount of the phosphoric acid group introduced. The amount of the phosphoric acid group introduced in the obtained phosphoric acid-modified cellulose fiber was 1.34 mmol/g. A sheet was obtained in the same way as in Example A2 except that this phosphoric acid-modified cellulose fiber was used as a raw material.

Example A6

A sheet was obtained in the same way as in Example A1 except that the ultrafine cellulose fiber was cross-linked using an aqueous solution having a magnesium sulfate pure content of 5%, prepared using magnesium sulfate heptahydrate (manufactured by Kanto Chemical Co., Inc.).

Example A7

Undried needle bleached kraft pulp corresponding to a dry mass of 100 parts by mass, 1.6 parts by mass of TEMPO, and 10 parts by mass of sodium bromide were dispersed in 10000 parts by mass of water. Subsequently, an aqueous solution containing 13% by mass of sodium hypochlorite was added thereto such that the amount of sodium hypochlorite was 3.5 mmol with respect to 1.0 g of the pulp to start reaction. During the reaction, the pH was kept at 10 to 11 by the dropwise addition of a 1.0 M aqueous sodium hydroxide solution. The point in time when change in pH was no longer seen was regarded as the completion of the reaction to introduce the carboxy group to the pulp. This pulp slurry was dehydrated to obtain a dehydrated sheet. Then, 5000 parts by mass of ion-exchange water were poured to the pulp, which was then uniformly dispersed by stirring, followed by filtration and dehydration to obtain a dehydrated sheet. This step was repeated twice to obtain carboxy group-modified cellulose fiber. The amount of the carboxy group introduced in the obtained carboxy group-modified cellulose fiber was 1.01 mmol/g. A sheet was obtained in the same way as in Example A2 except that this carboxy group-modified cellulose fiber was used as a raw material.

Example A8

A sheet was obtained in the same way as in Example A7 except that the amount of sodium hypochlorite added in the carboxy group introduction step was changed to 8.0 mmol. The amount of the carboxy group introduced in the carboxy group-modified cellulose fiber thus obtained was 1.48 mmol/g.

Example A9

A sheet was obtained in the same way as in Example A1 except that the cross-linking treatment of the ultrafine cellulose fiber was not carried out.

Example A10

A sheet was obtained in the same way as in Example A1 except that phosphoric acid-modified cellulose fiber in which the amount of the phosphoric acid group introduced was 1.34 mmol/g was used.

Example A11

A sheet was obtained in the same way as in Example A7 except that the cross-linking treatment of the ultrafine cellulose fiber was not carried out.

Example A12

A sheet was obtained in the same way as in Example A11 except that carboxy group-modified cellulose fiber in which the amount of the carboxy group introduced was 1.48 mmol/g was used.

[Evaluation]

<Method>

The sheets prepared in Examples A1 to A12 were evaluated according to evaluation methods given below.

(1) Measurement of Amount of Substituent on Cellulose Surface (Titration Method)

Cellulose ultrafine fiber-containing slurry having a solid content of approximately 0.04 g in terms of absolute dry mass was separated and diluted to approximately 50 g using ion-exchange water. When a 0.01 N aqueous sodium hydroxide solution was added dropwise to this solution with stirring using a magnetic stirrer, change in the value of electric conductivity was measured. The amount of the 0.01 N aqueous sodium hydroxide solution added dropwise that offered the smallest value of electric conductivity was defined as the amount of the solution added dropwise at the titration end-point.

An amount X of the substituent on the cellulose surface is represented by X (mmol/g)=0.01 (mol/1)×V (ml)/W (g). In this context, V: the amount of the 0.01 N aqueous sodium hydroxide solution added dropwise (ml), and W: the solid content (g) in the cellulose ultrafine fiber-containing slurry.

(2) Total Light Transmittance of Sheet

The total light transmittance was measured using a haze meter ("HM-150" manufactured by Murakami Color Research Laboratory Co., Ltd.) according to JIS K7361.

(3) Haze of Sheet

The haze was measured using a haze meter ("HM-150" manufactured by Murakami Color Research Laboratory Co., Ltd.) according to JIS K7136.

(4) Amount of Aluminum Introduced, Amount of Magnesium Introduced, and Amount of Sulfur Introduced in Sheet The aluminum, magnesium, and sulfur atom concentrations in each sheet were measured by fluorescent X-ray analysis. Specifically, the characteristic X-ray intensity of an aluminum, magnesium, or sulfur atom released when an outer electron was transferred to a vacancy resulting from the excitation of the core electron of the aluminum, magnesium, or sulfur atom by the irradiation of the sheet with X rays was measured to obtain the concentration of the aluminum, magnesium, or sulfur atom.

The measurement conditions are as described below.

Analysis apparatus: fluorescent X-ray analysis apparatus (XRF) PW-2404 manufactured by Spectris
Measurement sample: round sample having a diameter of 27 mm
X-ray tube: Rh tube
Target: rhodium
Dispersive crystal: PE (aluminum), PX1 (magnesium), Ge (sulfur)
Excitation light energy: 32 kV-125 mA
Measurement line: aluminum Al—K$\alpha$1, magnesium Mg—K$\alpha$1, sulfur S—K$\alpha$1
2$\theta$ angle peak: 145.003 (aluminum), 23.100 (magnesium), 110.734 (sulfur)
Measurement time: 58 seconds (aluminum), 50 seconds (magnesium), 54.6 seconds (sulfur)

Filter paper having a known amount of aluminum introduced was prepared. After implementation of fluorescent X-ray analysis in the same way as above, a calibration curve of the characteristic X-ray intensity of an Al atom vs. the amount of aluminum introduced was prepared (FIG. 1). As for magnesium, filter paper having a known amount of magnesium introduced was also prepared, and a calibration curve of the characteristic X-ray intensity of a Mg atom vs. the amount of magnesium introduced was prepared (FIG. 2). As for sulfur, filter paper having a known amount of sulfur introduced was also prepared, and a calibration curve of the characteristic X-ray intensity of a S atom vs. the amount of sulfur introduced was prepared (FIG. 3).

Then, the concentration (mmol) of the aluminum, magnesium, or sulfur atom in the sheet was obtained by applying the characteristic X-ray intensity of the aluminum, magnesium, or sulfur atom to the calibration curve. The obtained concentration of the aluminum, magnesium, or sulfur atom was divided by the mass of the sheet used in the fluorescent X-ray analysis to determine the amount of the element introduced (mmol/g) in the sheet.

In this context, a mass Z of the sheet used in the fluorescent X-ray analysis is represented by Z (g)=W (cm$^2$)×X (g/cm$^3$)×Y (cm). In this context, W: the area (cm$^2$) of the sheet used in the fluorescent X-ray analysis, X: the density (g/cm$^3$) of the sheet, Y: the thickness (cm) of the sheet.

The mark "-" in the table represents a trace amount.

(5) Tensile Properties of Sheet Under Wet Conditions

The tensile strength and the tensile modulus of elasticity were measured according to JIS P 8135 under wet conditions using a tensile tester Tensilon (manufactured by A&D Co., Ltd.). Each sheet was dipped in ion-exchange water for 24 hours and then used as a test specimen.

The term "Swollen and broken" in the table refers to a state where the sheet thus dipped in ion-exchange water under the conditions described above was unable to keep its shape due to swelling so that the tensile properties was immeasurable.

(6) Water Absorption Rate of Sheet

Each sheet of 50 mm square was dipped in ion-exchange water for 24 hours, and the water absorption rate was determined from the ratio of the mass of the dipped sheet to the absolute dry mass of the sheet. The absolute dry mass was determined from the mass of the sheet dried at 105° C. for 24 hours.

The term "Swollen and broken" in the table refers to a state where the sheet thus dipped in ion-exchange water under the conditions described above was unable to keep its shape due to swelling so that the mass of the sheet after water absorption was immeasurable.

(7) Density of Sheet

Each sheet of 50 mm square was subjected to moisture control under conditions of 23° C. and 50% RH for 24 hours. Then, the density (g/cm$^3$) of the sheet was determined from the thickness and mass of the sheet.

<Results>

The results are shown in the table given below. Examples A9 to A12 serve as comparative examples.

TABLE 1

| | Ionic substituent | Amount of substituent introduced [mmol/g] | Fiber diameter [nm] | Cross-linking treatment | | Sheet density [g/cm$^3$] | Element concentration [kcps] | | |
|---|---|---|---|---|---|---|---|---|---|
| | | | | Aqueous solution name | Concentration in aqueous solution [%] | | Al | Mg | S |
| Example A1 | Phosphoric acid group | 0.98 | 4-20 | Aluminum sulfate | 1 | 1.6 | 88 | 0 | 16 |
| Example A2 | Phosphoric acid group | 0.98 | 4-20 | Aluminum sulfate | 5 | 1.6 | 114 | 0 | 44 |
| Example A3 | Phosphoric acid group | 0.98 | 4-20 | Aluminum sulfate | 10 | 1.7 | 97 | 0 | 37 |
| Example A4 | Phosphoric acid group | 0.98 | 4-20 | Aluminum sulfate | 15 | 1.7 | 98 | 0 | 46 |
| Example A5 | Phosphoric acid group | 1.34 | 4-20 | Aluminum sulfate | 5 | 1.7 | 133 | 0 | 47 |
| Example A6 | Phosphoric acid group | 0.98 | 4-20 | Magnesium sulfate | 5 | 1.5 | 0 | 96 | — |
| Example A7 | Carboxy group | 1.01 | 4-20 | Aluminum sulfate | 5 | 1.5 | 32 | 0 | — |

TABLE 1-continued

| | | | | | | | | | |
|---|---|---|---|---|---|---|---|---|---|
| Example A8 | Carboxy group | 1.48 | 4-20 | Aluminum sulfate | 5 | 1.7 | 51 | 0 | — |
| Example A9 | Phosphoric acid group | 0.98 | 4-20 | | | 1.4 | | | |
| Example A10 | Phosphoric acid group | 1.34 | 4-20 | | | 1.7 | | | |
| Example A11 | Carboxy group | 1.01 | 4-20 | | | 1.4 | | | |
| Example A12 | Carboxy group | 1.48 | 4-20 | | | 1.8 | | | |

| | Amount of element introduced [mmol/g] | | | Total light transmittance [%] | Haze [%] | Tensile properties (wet conditions) | | Water absorption rate [%] |
|---|---|---|---|---|---|---|---|---|
| | Al | Mg | S | | | Strength [MPa] | Modulus of elasticity [GPa] | |
| Example A1 | 1.10 | 0.00 | 0.02 | 92.7 | 1.4 | 29.0 | 1.4 | 166 |
| Example A2 | 1.51 | 0.00 | 0.07 | 91.9 | 1.1 | 32.5 | 2.3 | 206 |
| Example A3 | 1.18 | 0.00 | 0.06 | 91.6 | 3.6 | 29.0 | 2.5 | 171 |
| Example A4 | 1.17 | 0.00 | 0.08 | 91.4 | 4.4 | 29.5 | 2.7 | 165 |
| Example A5 | 1.71 | 0.00 | 0.07 | 92.4 | 1.8 | 23.5 | 2.7 | 174 |
| Example A6 | 0.00 | 0.87 | — | 91.7 | 1.6 | 18.7 | 1.1 | 313 |
| Example A7 | 0.33 | 0.00 | — | 91.2 | 3.5 | 19.5 | 1.0 | 311 |
| Example A8 | 0.55 | 0.00 | — | 91.5 | 5.6 | 15.1 | 1.9 | 239 |
| Example A9 | | | | 91.7 | 0.7 | Swollen and broken | Swollen and broken | Swollen and broken |
| Example A10 | | | | 91.7 | 2.0 | Swollen and broken | Swollen and broken | Swollen and broken |
| Example A11 | | | | 91.1 | 2.1 | Swollen and broken | Swollen and broken | 6095 |
| Example A12 | | | | 90.6 | 2.7 | Swollen and broken | Swollen and broken | Swollen and broken |

Example B1

<Preparation of Phosphoric Acid Group-Introduced Cellulose Fiber>

Pulp manufactured by Oji Paper Co., Ltd. (solid content: 93%, basis weight: 208 g/m², sheet-shaped, Canadian Standard Freeness (CSF) measured according to JIS P 8121 after defibration: 700 ml) was used as softwood kraft pulp. 100 parts by mass (absolute dry mass) of the softwood kraft pulp were impregnated with a mixed aqueous solution of ammonium dihydrogen phosphate and urea and were compressed so as to be 49 parts by mass of the ammonium dihydrogen phosphate and 130 parts by mass of the urea to obtain chemical-impregnated pulp. The obtained chemical-impregnated pulp was dried in a dryer of 105° C. for moisture evaporation to predry the chemical-impregnated pulp. Then, the chemical-impregnated pulp was heated in an air-blow dryer set to 140° C. for 10 minutes so that the phosphoric acid group was introduced to cellulose in the pulp to obtain phosphorylated pulp. 10000 parts by mass of ion-exchange water were poured to 100 parts by mass (absolute dry mass) of the obtained phosphorylated pulp, which was then uniformly dispersed by stirring, followed by filtration and dehydration to obtain a dehydrated sheet. This step was repeated twice to obtain phosphoric acid-modified cellulose fiber. The amount of the phosphoric acid group introduced in the obtained phosphoric acid-modified cellulose fiber was 0.98 mmol/g.

<Machine Process>

After washing and dehydration, ion-exchange water was added to the obtained pulp to prepare a pulp suspension having a concentration of 1.0% by mass. This pulp suspension was passed through a wet atomization apparatus (manufactured by Sugino Machine Ltd.; Ultimizer) five times at a pressure of 245 MPa to obtain ultrafine cellulose fiber suspension.

<Sheet Formation>

Polyethylene glycol (manufactured by Wako Pure Chemical Industries, Ltd.; molecular weight: 4,000,000) was added to the ultrafine cellulose fiber suspension so as to be 20 parts by mass with respect to 100 parts by mass of the ultrafine cellulose fiber. The concentration was adjusted to 0.5% by mass in terms of solid concentration. The suspension was measured such that the finished basis weight of a sheet was 45 g/m². The suspension was developed to a commercially available acrylic plate and dried in a chamber of 35° C. and 15% RH. A plate for damming was disposed on the acrylic plate so as to achieve the predetermined basis weight. The sheet was obtained by these procedures and had a thickness of 30 μm.

<Cross-Linking of Ultrafine Cellulose Fiber, and Treatment with Sodium Acetate>

The ultrafine cellulose fiber sheet was dipped for 30 minutes in an aqueous solution having an aluminum sulfate pure content of 5%, prepared using aluminum sulfate tetradecahydrate to octadecahydrate (manufactured by Kanto Chemical Co., Inc.), to perform cross-linking treatment with aluminum. This sheet was dipped in ion-exchange water for 15 minutes for washing. The washing was repeated twice. Then, the sheet was dipped in an aqueous solution containing 5% sodium acetate (manufactured by Kanto Chemical Co., Inc.) for 30 minutes. This sheet was dipped in ion-exchange water for 15 minutes for washing. The washing was repeated twice. Then, the sheet was attached to an acrylic plate and dried in a chamber of 35° C. and 15% RH.

Example B2

A sheet was obtained in the same way as in Example B1 except that the concentration of the sodium acetate in the aqueous solution was changed to 10%.

Example B3

A sheet was obtained in the same way as in Example B1 except that the concentration of the sodium acetate in the aqueous solution was changed to 15%.

Example B4

A sheet was obtained in the same way as in Example B1 except that the concentration of the sodium acetate in the aqueous solution was changed to 20%.

Example B5

A sheet was obtained in the same way as in Example B1 except that the concentration of the sodium acetate in the aqueous solution was changed to 30%.

Example B6

A sheet was obtained in the same way as in Example B1 except that an aqueous solution containing 5% calcium acetate was used instead of the treatment with the aqueous sodium acetate solution.

Example B7

A sheet was obtained in the same way as in Example B6 except that the concentration of the calcium acetate in the aqueous solution was changed to 20%.

Example B8

A sheet was obtained in the same way as in Example B1 except that an aqueous solution containing 5% sodium bicarbonate was used instead of the treatment with the aqueous sodium acetate solution.

Example B9

Pulp manufactured by Oji Paper Co., Ltd. (solid content: 93%, basis weight: 208 g/m$^2$, sheet-shaped, Canadian Standard Freeness (CSF) measured according to JIS P 8121 after defibration: 700 ml) was used as softwood kraft pulp. 100 parts by mass (absolute dry mass) of the softwood kraft pulp were impregnated with a mixed aqueous solution of ammonium dihydrogen phosphate and urea and were compressed so as to be 49 parts by mass of the ammonium dihydrogen phosphate and 130 parts by mass of the urea to obtain chemical-impregnated pulp. The obtained chemical-impregnated pulp was dried in a dryer of 105° C. for moisture evaporation to predry the chemical-impregnated pulp. Then, the chemical-impregnated pulp was heated in an air-blow dryer set to 140° C. for 10 minutes so that the phosphoric acid group was introduced to cellulose in the pulp to obtain phosphorylated pulp. 10000 parts by mass of ion-exchange water were poured to 100 parts by mass (absolute dry mass) of the obtained phosphorylated pulp, which was then uniformly dispersed by stirring, followed by filtration and dehydration to obtain a dehydrated sheet. This step was repeated twice to obtain phosphoric acid-modified cellulose fiber having a high amount of the phosphoric acid group introduced. The amount of the phosphoric acid group introduced in the obtained phosphoric acid-modified cellulose fiber was 1.34 mmol/g. A sheet was obtained in the same way as in Example B4 except that this phosphoric acid-modified cellulose fiber was used as a raw material.

Example B10

A sheet was obtained in the same way as in Example B1 except that an aqueous solution containing 5% sodium citrate was used instead of the treatment with the aqueous sodium acetate solution.

Example B11

A sheet was obtained in the same way as in Example B1 except that the treatment with sodium acetate was not carried out.

Example B12

A sheet was obtained in the same way as in Example B9 except that the treatment with sodium acetate was not carried out.

Example B13

A sheet was obtained in the same way as in Example B1 except that the cross-linking treatment with aluminum and the subsequent procedures were not carried out.

Example B14

A sheet was obtained in the same way as in Example B9 except that the cross-linking treatment with aluminum and the subsequent procedures were not carried out.

[Evaluation]
<Method>

The sheets prepared in Examples B1 to B14 were evaluated according to evaluation methods given below.

(1) Measurement of Amount of Substituent on Cellulose Surface (Titration Method)

Cellulose ultrafine fiber-containing slurry having a solid content of approximately 0.04 g in terms of absolute dry mass was separated and diluted to approximately 50 g using ion-exchange water. When a 0.01 N aqueous sodium hydroxide solution was added dropwise to this solution with stirring using a magnetic stirrer, change in the value of electric conductivity was measured. The amount of the 0.01 N aqueous sodium hydroxide solution added dropwise that offered the smallest value of electric conductivity was defined as the amount of the solution added dropwise at the titration end-point.

An amount X of the substituent on the cellulose surface is represented by X (mmol/g)=0.01 (mol/1)×V (ml)/W (g). In this context, V: the amount of the 0.01 N aqueous sodium hydroxide solution added dropwise (ml), and W: the solid content (g) in the cellulose ultrafine fiber-containing slurry.

(2) Total Light Transmittance of Sheet

The total light transmittance was measured using a haze meter ("HM-150" manufactured by Murakami Color Research Laboratory Co., Ltd.) according to JIS K7361.

(3) Haze of Sheet

The haze was measured using a haze meter ("HM-150" manufactured by Murakami Color Research Laboratory Co., Ltd.) according to JIS K7136.

(4) Yellowness Before and after Heating

The yellowness before and after heating of each sheet was measured according to JIS K7373 using Colour Cute i (Suga Test Instruments Co., Ltd.).

The heating conditions involved vacuum drying at 200° C. for 4 hours.

(5) Amount of Sodium Introduced, Amount of Sulfur Introduced, Amount of Aluminum Introduced, and Amount of Calcium Introduced in Sheet The sodium, sulfur, aluminum, and calcium atom concentrations in each sheet were measured by fluorescent X-ray analysis. Specifically, the characteristic X-ray intensity of a sodium, sulfur, aluminum, or calcium atom released when an outer electron was transferred to a vacancy resulting from the excitation of the core electron of the sodium, sulfur, aluminum, or calcium atom by the irradiation of the sheet with X rays was measured to obtain the concentration of the sodium, sulfur, aluminum, or calcium atom.

The measurement conditions are as described below.

Analysis apparatus: fluorescent X-ray analysis apparatus (XRF) PW-2404 manufactured by Spectris Measurement sample: round sample having a diameter of 27 mm X-ray tube: Rh tube Target: rhodium Dispersive crystal: PX1 (sodium), Ge (sulfur), PE (aluminum), LiF200 (calcium)

Excitation light energy: 32 kV-125 mA (sodium, sulfur, aluminum), 40 kV-100 mA (calcium)

Measurement line: sodium Na—K$\alpha$1, sulfur S—K$\alpha$1, aluminum Al—K$\alpha$1, calcium Ca—K$\alpha$1

2$\theta$ angle peak: 28.009 (sodium), 110.734 (sulfur), 145.003 (aluminum), 132.718 (calcium)

Measurement time: 50 seconds (sodium), 54.6 seconds (sulfur), 58 seconds (phosphorus), 50 seconds (calcium)

Filter paper having a known amount of sodium introduced was prepared. After implementation of fluorescent X-ray analysis in the same way as above, a calibration curve of the characteristic X-ray intensity of a Na atom vs. the amount of sodium introduced was prepared (FIG. 4). As for sulfur, aluminum, and calcium, filter paper having a known amount of sulfur, aluminum, or calcium introduced was also prepared, and a calibration curve of the characteristic X-ray intensity of a S, Al, or Ca atom vs. the amount of sulfur, aluminum, or calcium introduced was prepared (FIGS. 3, 1, and 5).

Then, the concentration (mmol) of sodium, sulfur, aluminum, or calcium in the sheet was obtained by applying the characteristic X-ray intensity of sodium, sulfur, aluminum, or calcium to the calibration curve. The obtained concentration of sodium, sulfur, aluminum, or calcium was divided by the mass of the sheet used in the fluorescent X-ray analysis to determine the amount of the element introduced (mmol/g) in the sheet.

In this context, a mass Z of the sheet used in the fluorescent X-ray analysis is represented by Z (g)=W (cm$^2$)×X (g/cm$^3$)×Y (cm). In this context, W: the area (cm$^2$) of the sheet used in the fluorescent X-ray analysis, X: the density (g/cm$^3$) of the sheet, Y: the thickness (cm$^2$) of the sheet.

(6) Tensile Properties of Sheet (Dry Conditions and Wet Conditions)

The tensile strength, the tensile modulus of elasticity, and the tensile elongation were measured according to JIS P 8113 and JIS P 8135 using a tensile tester Tensilon (manufactured by A&D Co., Ltd.). Under usual conditions, each sheet was subjected to moisture control at 23° C. at 50% RH for 24 hours and used as a test specimen. Under wet conditions, each sheet was dipped in ion-exchange water for 24 hours and then used as a test specimen.

The term "Swollen and broken" in the table refers to a state where the sheet thus dipped in ion-exchange water under the conditions described above was unable to keep its shape due to swelling so that the tensile properties was immeasurable.

(7) Water Absorption Rate of Sheet

Each sheet of 50 mm square was dipped in ion-exchange water for 24 hours, and the water absorption rate was determined from the ratio of the mass of the dipped sheet to the absolute dry mass of the sheet. The absolute dry mass was determined from the mass of the sheet dried at 105° C. for 24 hours.

The term "Swollen and broken" in the table refers to a state where the sheet thus dipped in ion-exchange water under the conditions described above was unable to keep its shape due to swelling so that the mass of the sheet after water absorption was immeasurable.

(8) Density of Sheet

Each sheet of 50 mm square was subjected to moisture control under conditions of 23° C. and 50% RH for 24 hours. Then, the density (g/cm$^3$) of the sheet was determined from the thickness and mass of the sheet.

<Results>

The results are shown in the table given below. Examples B13 and B14 serve as comparative examples.

TABLE 2

| | | | | Treatment at first stage | | Treatment at second stage | | | Element concentration [kcps] | | | | Amount of element introduced [mmol/g] | |
|---|---|---|---|---|---|---|---|---|---|---|---|---|---|---|
| | Ionic substituent | Amount of substituent introduced [mmol/g] | Fiber diameter [nm] | Aqueous solution name | Concentration in aqueous solution [%] | Aqueous solution name | Concentration in aqueous solution [%] | Sheet density [g/cm$^3$] | Na | S | Al | Ca | Na | S |
| Example B1 | Phosphoric acid group | 0.98 | 4-20 | Aluminum sulfate | 5 | Sodium acetate | 5 | 1.7 | 12 | 0 | 104 | 0 | 0.25 | 0.00 |
| Example B2 | Phosphoric acid group | 0.98 | 4-20 | Aluminum sulfate | 5 | Sodium acetate | 10 | 1.7 | 21 | 0 | 99 | 0 | 0.40 | 0.00 |

TABLE 2-continued

| | | | | | | | | | | | | | | |
|---|---|---|---|---|---|---|---|---|---|---|---|---|---|---|
| Example B3 | Phosphoric acid group | 0.98 | 4-20 | Aluminum sulfate | 5 | Sodium acetate | 15 | 1.7 | 28 | 0 | 95 | 0 | 0.53 | 0.00 |
| Example B4 | Phosphoric acid group | 0.98 | 4-20 | Aluminum sulfate | 5 | Sodium acetate | 20 | 1.8 | 16 | 0 | 103 | 0 | 0.31 | 0.00 |
| Example B5 | Phosphoric acid group | 0.98 | 4-20 | Aluminum sulfate | 5 | Sodium acetate | 30 | 1.8 | 26 | 0 | 89 | 0 | 0.47 | 0.00 |
| Example B6 | Phosphoric acid group | 0.98 | 4-20 | Aluminum sulfate | 5 | Calcium acetate | 5 | 1.6 | 0 | 0 | 97 | 24 | 0.00 | 0.00 |
| Example B7 | Phosphoric acid group | 0.98 | 4-20 | Aluminum sulfate | 5 | Calcium acetate | 20 | 1.8 | 0 | 0 | 104 | 26 | 0.00 | 0.00 |
| Example B8 | Phosphoric acid group | 0.98 | 4-20 | Aluminum sulfate | 5 | Sodium bicarbonate | 5 | 1.7 | 36 | 0 | 91 | 0 | 0.72 | 0.00 |
| Example B9 | Phosphoric acid group | 1.34 | 4-20 | Aluminum sulfate | 5 | Sodium acetate | 20 | 1.7 | 28 | 0 | 133 | 0 | 0.53 | 0.00 |
| Example B10 | Phosphoric acid group | 0.98 | 4-20 | Aluminum sulfate | 5 | Sodium citrate | 5 | 1.7 | 48 | 0 | 36 | 0 | 0.71 | 0.00 |
| Example B11 | Phosphoric acid group | 0.98 | 4-20 | Aluminum sulfate | 5 | | | 1.6 | 0 | 44 | 114 | | 0.04 | 0.08 |
| Example B12 | Phosphoric acid group | 1.34 | 4-20 | Aluminum sulfate | 5 | | | 1.7 | 0 | 47 | 133 | | 0.04 | 0.09 |
| Example B13 | Phosphoric acid group | 0.98 | 4-20 | | | | | 1.4 | 70 | | | | 1.54 | |
| Example B14 | Phosphoric acid group | 1.34 | 4-20 | | | | | 1.7 | 93 | | | | 1.69 | |

| | Amount of element introduced [mmol/g] | | Total light transmittance [%] | Haze [%] | Yellowness | | Tensile properties | | | | | | Water absorption rate [%] |
|---|---|---|---|---|---|---|---|---|---|---|---|---|---|
| | | | | | | | Dry conditions | | | Wet conditions | | | |
| | | | | | Before heating | After heating | Strength [MPa] | Modulus of elasticity [GPa] | Elongation [%] | Strength [MPa] | Modulus of elasticity [GPa] | Elongation [%] | |
| | Al | Ca | | | | | | | | | | | |
| Example B1 | 1.27 | 0.00 | 91.8 | 2.6 | 0.9 | 16.0 | 76.6 | 5.3 | 2.0 | 38.1 | 1.9 | 3.0 | 181 |
| Example B2 | 1.18 | 0.00 | 92.0 | 2.9 | 0.9 | 7.0 | 93.5 | 5.5 | 2.2 | 43.9 | 2.2 | 3.1 | 200 |
| Example B3 | 1.14 | 0.00 | 92.1 | 2.5 | 1.0 | 5.2 | 80.2 | 6.1 | 1.6 | 47.7 | 1.9 | 3.9 | 197 |
| Example B4 | 1.24 | 0.00 | 92.0 | 1.7 | 1.0 | 6.5 | 69.8 | 5.6 | 1.6 | 51.4 | 2.1 | 3.7 | 226 |
| Example B5 | 1.02 | 0.00 | 92.0 | 2.3 | 1.0 | 4.5 | 64.2 | 5.2 | 2.3 | 44.1 | 1.7 | 4.6 | 194 |
| Example B6 | 1.01 | 0.15 | 91.8 | 2.7 | 0.9 | 14.7 | 76.6 | 5.3 | 2.0 | 38.1 | 1.9 | 3.0 | 169 |
| Example B7 | 1.24 | 0.19 | 91.6 | 2.8 | 1.0 | 9.4 | 54.6 | 5.4 | 1.3 | 33.6 | 2.0 | 2.2 | 172 |
| Example B8 | 1.13 | 0.00 | 91.8 | 1.6 | 0.8 | 8.6 | 49.1 | 5.8 | 1.1 | 33.2 | 1.1 | 5.0 | 231 |
| Example B9 | 1.66 | 0.00 | 92.2 | 1.8 | 0.5 | 9.8 | 64.9 | 4.4 | 1.8 | 29.6 | 1.9 | 2.7 | 194 |
| Example B10 | 0.28 | 0.00 | 91.7 | 0.2 | 0.54 | 5.02 | 97.6 | 5.5 | 3.4 | 45.1 | 2.6 | 5.4 | 582.6 |
| Example B11 | 1.51 | | 91.9 | 1.1 | 0.6 | 91.2 | 34.6 | 5.4 | 0.9 | 32.5 | 2.3 | 1.4 | 206 |
| Example B12 | 1.71 | | 92.4 | 1.8 | 0.7 | 107.7 | 53.4 | 5.4 | 1.2 | 23.5 | 2.7 | 1.7 | 174 |
| Example B13 | | | 91.7 | 0.7 | 0.6 | 22.7 | 118.6 | 4.8 | 10.5 | Swollen and broken | Swollen and broken | Swollen and broken | Swollen and broken |
| Example B14 | | | 91.7 | 2 | 0.6 | 25.6 | 108.3 | 5.3 | 9.4 | Swollen and broken | Swollen and broken | Swollen and broken | Swollen and broken |

The invention claimed is:

1. A sheet comprising ultrafine fiber having an ionic substituent, and a divalent or higher metal, and further comprising a hydrophilic polymer or a hydrophilic low-molecular compound, and having a haze of 10.0% or less,
wherein an amount of the hydrophilic polymer or hydrophilic low-molecular compound is 1-200 parts by mass with respect to 100 parts by mass of solid content of the ultrafine fiber.

2. The sheet according to claim 1, wherein a content of the divalent or higher metal is 0.10 mmol/g or larger.

3. The sheet according to claim 1, wherein the ultrafine fiber is ultrafine cellulose fiber having one or two or more ionic substituents selected from the group consisting of a phosphoric acid-derived group, a carboxylic acid-derived group, and a sulfuric acid-derived group.

4. The sheet according to claim 1, wherein a tensile strength under wet conditions is 10.0 MPa or higher.

5. The sheet according to claim 1, wherein a tensile modulus of elasticity under wet conditions is 0.7 GPa or higher.

6. A laminate comprising an inorganic layer and/or an organic layer formed on at least one side of a sheet according to claim 1.

7. A sheet comprising ultrafine fiber having an ionic substituent, and a divalent or higher metal, and further comprising a hydrophilic polymer or a hydrophilic low-molecular compound,
wherein change in the degree of yellowing ($\Delta YI$) satisfies the following expression (1):

$$\Delta YI = YI_2 - YI_1 \leq 20 \qquad (1)$$

wherein $YI_1$ represents yellowness before vacuum drying at 200° C. for 4 hours, and $YI_2$ represents yellowness after the vacuum drying at 200° C. for 4 hours, and
wherein an amount of the hydrophilic polymer or hydrophilic low-molecular compound is 1-200 parts by mass with respect to 100 parts by mass of solid content of the ultrafine fiber.

8. The sheet according to claim 7, wherein a content of the divalent or higher metal is 0.10 mmol/g or larger.

9. The sheet according to claim 7, wherein the ultrafine fiber is ultrafine cellulose fiber having one or two or more ionic substituents selected from the group consisting of a phosphoric acid-derived group, a carboxylic acid-derived group, and a sulfuric acid-derived group.

10. The sheet according to claim 7, which further comprises an alkali metal.

11. The sheet according to claim 7, wherein the ultrafine fiber is ultrafine cellulose fiber having one or two ionic substituents selected from the group consisting of a phosphoric acid-derived group and a carboxylic acid-derived group, wherein a content of sulfur is 0.05 mmol/g or smaller.

12. The sheet according to claim 7, wherein a tensile strength under wet conditions is 20.0 MPa or higher.

13. The sheet according to claim 7, wherein a tensile modulus of elasticity under wet conditions is 0.7 GPa or higher.

14. A laminate comprising an inorganic layer and/or an organic layer formed on at least one side of a sheet according to claim 7.

* * * * *